United States Patent [19]

Israelsen et al.

[11] Patent Number: 5,247,348
[45] Date of Patent: Sep. 21, 1993

[54] METHOD FOR SELECTING REPRODUCTION QUALITY OF TRANSMITTED VECTOR QUANTIZED DATA

[75] Inventors: Paul D. Israelsen, North Logan, Utah; Keith Lucas, Richmond Hill, Canada

[73] Assignee: Scientific Atlanta, Inc., Atlanta, Ga.

[21] Appl. No.: 794,585

[22] Filed: Nov. 19, 1991

[51] Int. Cl.$^5$ .............................................. H04N 7/12
[52] U.S. Cl. ..................................... 358/86; 358/133
[58] Field of Search ................. 358/86, 133, 135, 136; 375/26, 27; 381/31, 36, 32

[56] References Cited

U.S. PATENT DOCUMENTS

| | | | |
|---|---|---|---|
| 4,878,230 | 10/1989 | Murakami et al. | 375/27 |
| 4,979,039 | 12/1990 | Kisor et al. | 358/133 |
| 4,994,927 | 2/1991 | Dixit et al. | 358/133 |
| 5,010,401 | 4/1991 | Murakami et al. | 358/136 |
| 5,014,127 | 5/1991 | Richards | 358/133 |
| 5,021,971 | 6/1991 | Lindsay | 364/513 |
| 5,031,037 | 7/1991 | Israelsen | 358/133 |
| 5,067,152 | 11/1991 | Kisor et al. | 380/10 |
| 5,068,723 | 11/1991 | Dixit et al. | 358/133 |
| 5,148,272 | 9/1992 | Acampora et al. | 358/133 |

OTHER PUBLICATIONS

"Image Coding Using Vertor Quantization" Proc. IEEE Int. Conf. Acoust., Speech, Signal Processing, pp. 428-431 May 1982, A. Gersho et al.

"Least Squares Optimization in PCM", Bell Lab Tech. Note (1957), S. P. Lloyd.

"Pattern Recognition Principles" pp. 94-109 Addison-Wesley, Reading, Mass. (1974), J. T. Ton et al.

"Vector Quantization and Predictive Quantizers for Gauss Markov Sources", IEEE Trans Comm. vol. Com-30, pp. 381-389, Feb. 1982, Cray et al.

"Image Coding Using Vector Quantization: A Review", IEEE Comm., vol. 36, No. 8, Aug. 1988, Nasrabadi et al.

"Vector Quantization of Digital Images", Ph.D. Dissertation, Stanford University, Dept. of Elec. Engr., pp. 32-48 1984, Baker.

"Image Compression Using Adaptive Vector Quantization", IEEE Com., vol. Com-34 No. 2 (Feb. 1986), Goldberg et al.

"An Algorithm for Vector Quantizer Design", IEEE Transactions an Communications, vol. Com-28, No. 1, Jan. 1980, Linde et al.

"Full Search and Tree Searched Vector Quantization of Speech Waveforms," Proc. IEEE Int. Conf. Acoust., Speech, Signal Processing, pp. 593-596, May 1982, Gray et al.

"Vector Quantization of Digital Images", Baker, Richard L., Stanford University—University Microfilms International, UMI Dissertation Information Service, (Copyright 1984).

"Vector Quantization", Gray, Richard M., The Institute of Electrical and Electronics Engineers, Inc., ASSP Mag., vol. 1, pp. 4-29, Apr., 1984.

(List continued on next page.)

Primary Examiner—Reinhard J. Eisenzopf
Assistant Examiner—Lisa Charouel
Attorney, Agent, or Firm—Woodcock Washburn Kurtz Mackiewicz & Norris

[57] ABSTRACT

A method of communicating data from a first location to a second location employing a vector quantization data compression technique that allows users to select the reproduction quality of the transmitted vector quantized data. According to the method, data is encoded (compressed) from the last level of a first tree search vector quantization codebook at the first location. A second tree search vector quantization codebook is provided at the second location having a number of levels equal to or less than the number of levels in the first codebook. The reproduction quality of the transmitted vector quantized data is a function of the number of levels in the second codebook.

36 Claims, 11 Drawing Sheets

OTHER PUBLICATIONS

"Variable Rate Vector Quantization of Images", Riskin, Eve A., Dissertation submitted to the Dept. of Electrical Engineering—Stanford University, May 1990.

"Pruned Tree-Structured Vector Quantization in Image Coding", Riskin, Eve A., et al., Information Systems Lab., Stanford University—Stanford, California (May 25, 1989).

"Image Compression Methods With Distortion Controlled Capabilities", Markas, T. et al., Depts. of Elec. Eng. and Computer Science, Duke University, Durham, N.C. (Apr. 8, 1991).

"Variable Rate Vector Quantization for Medical Image Compression", Riskin, Eve A., Lookabaugh, T., et al., IEEE Trans. on Medical Imaging, vol. 9, No. 3, Sep. 1990.

"Progressive Image Transmission: A Review and Comparison of Techniques", Tzou, Kou-Hu, Optical Engineering, vol. 26, No. 7, Jul. (1987).

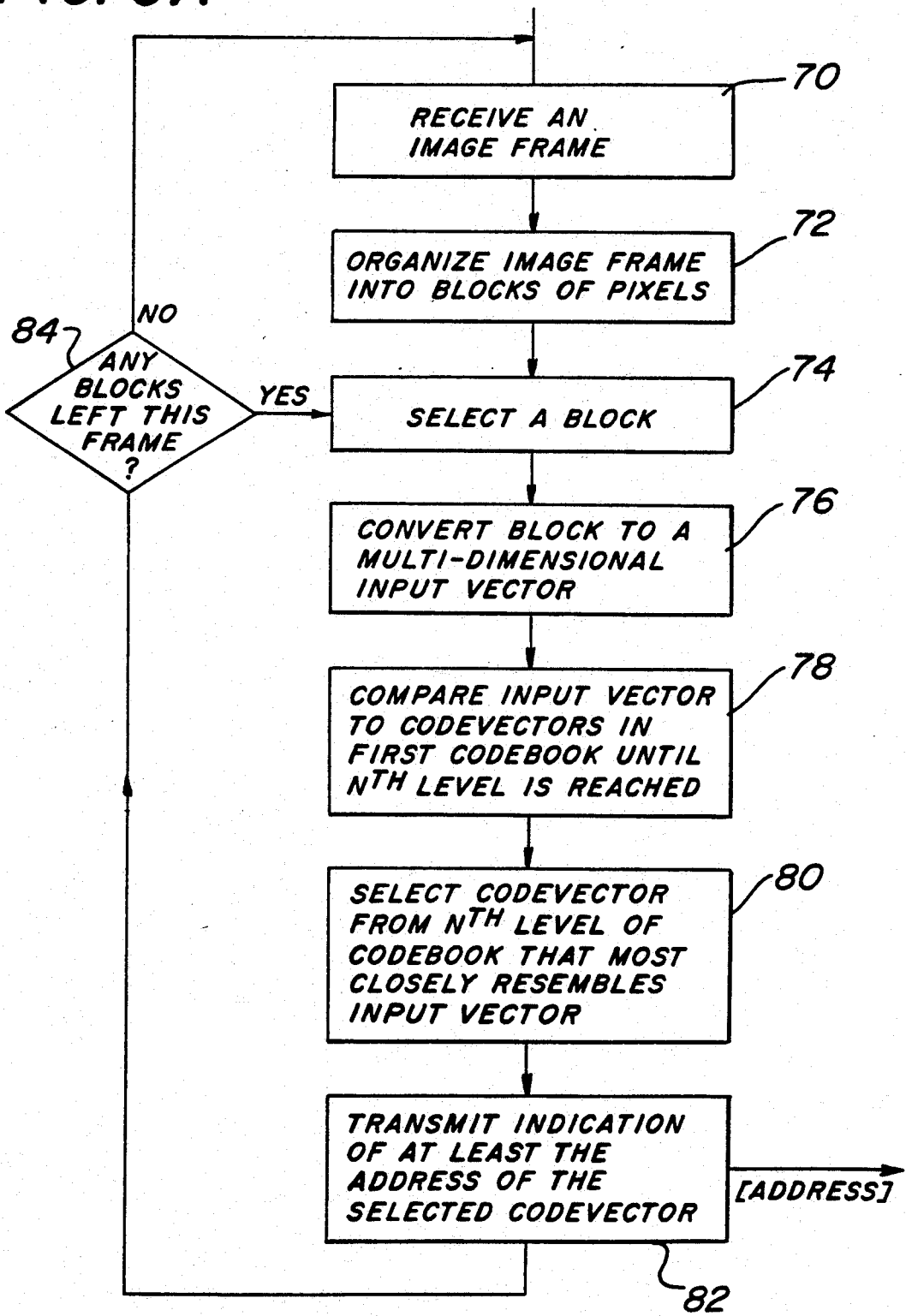

METHOD FOR SELECTING REPRODUCTION QUALITY OF TRANSMITTED VECTOR QUANTIZED DATA

RELATED APPLICATION DATA

The subject matter of this application is related to the subject matter of co-pending patent application Ser. No. 07/794,493, entitled "Progressive Transmission of Vector Quantized Data."

FIELD OF THE INVENTION

The present invention relates generally to a method of communicating vector quantized data from a first location to a second location, and more particularly, to a method of communicating vector quantized data from a first location to a second location wherein users select the reproduction quality of the quantized data.

BACKGROUND OF THE INVENTION

The background of the present invention is described herein in the context of pay television systems, such as cable television systems or direct broadcast satellite (DBS) systems, that distribute program material to subscribers, but the invention is by no means limited thereto except as expressly set forth in the accompanying claims.

In a typical cable television system, cable television operators receive much of their program material from remote earth station transmitters via a plurality of geosynchronous orbit satellites. The cable operator selects the program material to be made available to its subscribers by making arrangements with the satellite distributors of that program material The cable operator receives the transmitted program material at its "cable head-end," where it then re-transmits the data to individual subscribers. Frequently, cable operators also provide their own local programming at the site of the head-end, and further include network broadcasts as well.

In a DBS system, individual subscribers are provided with their own satellite receiver. Each subscriber establishes a down-link which receives the signal broadcast by the satellite directly. Thus, there is no need, as with cable systems, for re-transmission from a cable head-end.

Typically, in both types of systems (cable and DBS), the program material (both video and audio) is originally in analog form. Conventional transmission techniques place substantial limitations on the maximum number of viewer channels that can be transmitted over any given transponder on a satellite since each channel requires a minimum bandwidth to avoid noticeable degradation and the total number of channels that can be transmitted over a given satellite transponder is limited by its bandwidth and the bandwidth of each signal. Also, in cable systems, the electrical properties of the coaxial cable and associated amplifiers limit its bandwidth and therefore place substantial limitations on the number of channels that can be delivered to cable television subscribers using conventional transmission techniques.

As a result of the desire to provide more program channels to subscribers over existing distribution channels, the pay television industry has begun to investigate digital image transmission techniques. Although the desire is to minimize the transmission bandwidth of program material, thus allowing more channels to be transmitted over an existing broadcast channel, digital image transmission further offers the advantage that digital data can be processed at both the transmission and reception ends to improve picture quality. Unfortunately, the process of converting the program material from analog form to digital form results in data expansion which increases the transmission bandwidth of the program material rather than decreasing it. Therefore, digital transmission alone does not solve the bandwidth problem, but instead makes it worse. However, through the application of digital data compression techniques, large bandwidth reductions can be achieved.

Data compression techniques minimize the quantity of data required to represent each image. Thus, more program material, or more channels, can be offered over an existing broadcast channel. However, any data compression achieved is offset by the data expansion which occurs during the analog to digital conversion. Therefore, to be practical, the compression technique employed must achieve a compression ratio large enough to provide a net data compression. Digital data compression techniques, such as Huffman encoding and LZW (Lempel, Ziv and Welch) encoding, offer, at best, compression ratios of 2.5 to 1 and do not sufficiently compensate for the amount of data expansion that occurs in converting data from analog to digital form.

In response to the need for large compression ratios, a number of so-called "lossy" compression techniques have been investigated for digital image compression. Unlike the Huffman and LZW encoding techniques, these "lossy" compression techniques do not provide exact reproduction of the data upon decompression. Thus, some degree of information is lost; hence the label "lossy." One such "lossy" compression technique is called DCT (discrete cosine transform) data compression. Another method, which, until recently, has been used principally for speech compression, is vector quantization. Vector quantization has shown promise in image compression applications by offering high image compression rates, while also achieving high fidelity image reproduction at the receiving end. It has been demonstrated, for example, that using vector quantization (hereinafter sometimes referred to as "VQ"), compression rates as high as 25:1, and even as high as 50:1, can be realized without significant visually perceptible degradation in image reproduction.

Compression of video images by vector quantization involves dividing the pixels of each image frame into smaller blocks of pixels, or sub-images, and defining a "vector" from relevant data (such as intensity and/or color) reported by each pixel in the sub-image. The vector (sometimes called an "image vector") is really nothing more than a matrix of values (intensity and/or color) reported by each pixel in the sub-image. For example, a black and white image of a house might be defined by a 600×600 pixel image, and a 6×4 rectangular patch of pixels, representing, for example, a shadow, or part of a roof line against a light background, might form the sub-image from which the vector is constructed. The vector itself might be defined by a plurality of gray scale values representing the intensity reported by each pixel. While a black and white image serves as an example here, vectors might also be formed from red, green, or blue levels of a color image, or from the Y, I and Q components of a color image, or from transform coefficients of an image signal.

Numerous methods exist for manipulating the block, or sub-image, to form a vector. R. M. Gray, "Vector Quantization", *IEEE ASSP Mag.*, pp. 4–29 (April, 1984), describes formation of vectors for monochrome images. E. B. Hilbert, "Cluster Compression Algorithm: A Joint Clustering/Data Compression Concept", Jet Propulsion Laboratory, Pasadena, CA, Publ. 77–43, describes formation of vectors from the color components of pixels. A. Gersho and B. Ramamurthi, "Image Coding Using Vector Quantization", *Proc. IEEE Int. Conf. Acoust., Speech, Signal Processing,* pp. 428–431 (May, 1982), describes vector formation from the intensity values of spatially contiguous groups of pixels All of the foregoing references are incorporated herein by reference.

By way of example, a television camera might generate an analog video signal in a raster scan format having 600 scan lines per frame. An analog to digital converter could then digitize the video signal at a sampling rate of 600 samples per scan line, each sample being a pixel. Digital signal processing equipment could then store the digital samples in a 600×600 pixel matrix. The 600×600 pixel matrix could then be organized into smaller blocks, for example 6×4 pixel blocks, and then each block could be converted into a vector.

In an image vector quantizer, a vector quantization "codebook" is created from training data comprising a representative sample of images which the quantizer is likely to encounter during use. The codebook consists of a memory containing a set of stored "codevectors," each representative of commonly encountered image vectors. For example, one codevector might be a 6×4 pixel solid black patch. Another codevector might have all white pixels in the top three rows, and all black pixels in the bottom three rows. Yet another codevector might have a gradient made up of white pixels in the top row, black pixels in the bottom row, and four rows of pixels in between having shades of gray from light to dark. Typically, a codebook of representative codevectors is generated using an iterative clustering algorithm, such as described in S. P. Lloyd, "Least Squares Optimization in PCM", *Bell Lab. Tech. Note,* (1957) (also found in IEEE Trans. Inform. Theory, Vol. IT-28, pp. 129–137, March (1982); and, J. T. Tou and R. C. Gonzalez, "Pattern Recognition Principles", pp. 94–109, Addison-Wesley, Reading, Mass. (1974). Both of these references are incorporated herein by reference.

Each codevector in the codebook is assigned a unique identification code, sometimes called a label. In practice, the identification codes, or labels, are the memory addresses of the codevectors. For each input image vector, data compression is achieved by selecting the codevector in the codebook that most closely matches the input image vector, and then transmitting the codebook address of the selected codevector rather than the input image vector itself. Compression results because the addresses of the selected codevectors are much smaller than the image vectors. At the receiving end, an identical codebook is provided. Data recovery is achieved by accessing the receiver codebook with the transmitted address to obtain the selected codevector. Because the selected codevector closely resembles the original input vector, the input vector is substantially reproduced at the receiver. The reproduced input vector can then be converted back to the block of pixels that it represents. Thus, in this manner, an entire image can be reconstructed at the receiver.

Some distortion of the original image does result, however, due to inexact matches between the input vectors and the selected codevectors. Remember, the codevectors in the codebook are only a representative sample of possible input vectors, and therefore, exact matches rarely occur during actual use of the quantizer. Increasing the size of the codebook used for compression and decompression generally decreases the distortion.

Many different techniques for searching a codebook to find the codevector that best matches the image vector have been proposed, but generally the methods can be classified as either a full search technique, or a branching (or tree) search technique. In a full search technique, the vector quantizer sequentially compares an input image vector to each and every codevector in the codebook. The vector quantizer computes a measure of distortion for each codevector and selects the one having the smallest distortion. The full search technique ensures selection of the best match, but involves the maximum number Of computational steps. Thus, while distortion can be minimized using a full search technique, it is computationally expensive. Y. Linde, A. Buzo and R. Gray, "An Algorithm For Vector Quantizer Design", *IEEE Transactions on Communications,* Vol. COM-28, No. 1 (January 1980), incorporated herein by reference, describes the full search technique and the computational steps involved in such a search. The full search technique is sometimes called "full search vector quantization" or "full search VQ".

The tree search technique can be thought of as one that searches a sequence of small codebooks, instead of one large codebook. The codebook structure can be depicted as a tree, and each search and decision corresponds to advancing one level or stage in the tree, starting from the root of the tree. Thus, the input vector is not compared to all the codevectors in the codebook, as with the full search technique. Consequently, the tree search technique reduces the number of codevectors that must be evaluated (and thus reduces search time). However, the more limited search generally does not guarantee selection of the optimum codevector. Therefore, a tree search vector quantizer requires a larger codebook memory to achieve the same level of distortion as the full-search technique. A detailed description of the tree search technique may be found in R. M. Gray and H. Abut, "Full Search and Tree Searched Vector Quantization of Speech Waveforms," *Proc. IEEE Int. Conf. Acoust., Speech, Signal Processing,* pp. 593–96 (May 1982), and R. M. Gray and Y. Linde, "Vector Quantization and Predictive Quantizers For Gauss Markov Sources", *IEEE Trans. Comm.,* Vol. COM-30, pp. 381–389 (February 1982), both of which are incorporated herein by reference. The tree search technique is sometimes referred to as "tree-search vector quantization", "tree-search VQ" and "TSVQ." This technique has found favor for compressing dynamic images, because it is computationally faster than the full search technique. However, as mentioned, tree-search VQ does not guarantee selection of the optimum codevector, and therefore, a larger codebook memory is required to achieve a given level of distortion than is required for full search VQ.

In a pay television system, the program material is typically compressed at a transmitter location and transmitted to cable operators via satellite. In digital TV distribution systems, cable operators may simply receive the compressed data from the satellite and retransmit the data via a cable television network to individual cable subscribers. Alternatively, cable operators may choose to decompress the data at the cable head-end and send the program material to individual subscribers in analog form. The device that performs vector quantization and compression at the transmitter is called an encoder, and the device that performs decompression and image reproduction at the receiving end is called a decoder.

Where the cable operator simply retransmits the compressed data to the cable subscriber (i.e. the cable operator does not decompress the data), the compressed nature of the data allows the cable operator to offer more channels over the cable distribution network. However, each television subscriber must have a vector quantization decoder in his home to decode (decompress) the program material for display on a television set, or for recording on a VCR. The large memory required for a tree-search vector quantization codebook can be prohibitive from a cost standpoint. DBS subscribers who receive the compressed data via satellite directly, face the same problem, since they too must have VQ decoders near their television sets. Cable operators who decompress the received data at the cable head-end, also may not wish to invest in a decoder having a large codebook memory. Also, cable operators who convert the compressed signal to NTSC at the cable head-end need higher picture quality than subscribers, since the final images received by the subscriber will have the picture impairments of both VQ (to the head-end) and the present day cable impairments of NTSC (noise and distortion). If cable operators were to pass the compressed digital signal through the cable system, the subscriber would not have the present day NTSC impairments of the cable system. Consequently, there is a need for a system that can deliver subscriber quality image data to a low cost decoder at the subscriber location while also delivering higher quality to the cable head-end where the cost of the decoder is less significant.

In other words, because of the prohibitive cost of a large VQ codebook memory in a subscriber decoder, there exists a need for a pay television system wherein the transmitter location employs a large VQ codebook for encoding the image data, but wherein individual subscribers can employ codebooks of differing memory sizes depending on the picture quality desired and their ability to pay. As mentioned above, decreasing the size of the VQ codebook at the receiver location will decrease the quality of the reproduced image. However, the decrease in cost offsets the decrease in picture quality. As the ability of a subscriber to pay increases, it would be desireable for the subscriber to be able to increase the image quality simply by replacing the existing decoder with a decoder having a larger codevector memory.

At the same time, there is a need for a vector quantization method which results in a reduction in the amount of memory needed for vector quantization while maintaining at least the same level of image reproduction fidelity. Also, due to the ever increasing demand for more program channels, there is a need for a method of still further increasing compression ratios available with tree search vector quantization. The present invention satisfies these needs.

SUMMARY OF THE INVENTION

Briefly stated, the present invention is directed to a method of communicating vector quantized data from a first location to a second location and for selecting the reproduction quality of the transmitted vector quantized data. In the preferred embodiment, the method is embodied in a pay television system wherein image data (usually program material, such as movies, etc.) is vector quantized at a transmitter location of pay television signals and transmitted via satellite to a plurality of receiving locations. The image data typically comprises temporally spaced image frames representing moving images to be displayed on a television set at a receiving location. According to the method of the present invention, an image frame to be transmitted is received and organized into blocks of image frame data. Each of these blocks is then converted to a multi-dimensional input vector.

There is provided, in a memory at the transmitter location, a first tree search vector quantization codebook having a plurality N of levels of codevectors with each succeeding level representing possible input vectors with greater accuracy than codevectors at a preceding level. Each codevector has an associated memory address. The length of a codevector's address corresponds to the level at which the codevector resides. Thus, the addresses of codevectors at a same level have the same length and the lengths increase with each successive level.

Each input vector is compared to the codevectors at each level of the first codebook until the Nth level is reached. From the Nth level of codevectors, the codevector that most closely resembles the input vector is selected. Thus, at the transmitter location, input vectors are always encoded from the Nth level of the tree search codebook. An indication of at least the address associated with the selected codevector is then transmitted from the transmitter location to the plurality of receiving locations.

Each receiving location is provided with a second tree search vector quantization codebook having a plurality L of levels of codevectors, where L is a user selectable number in the range of 1 to N. The codevectors of the L levels of the second codebook correspond to the codevectors of the first L levels of the first codebook on a one to one basis, and each codevector in the second codebook is identical to the corresponding codevector in the first codebook.

At each receiving location, the indications transmitted from the transmitter location are received. For each received indication, the address of the selected codevector is obtained. As received, the address is capable of addressing up to an Nth level of codevectors. If the number L of levels in the second codebook is less than the number N of levels in the first codebook, the obtained address is truncated for addressing only up to the Lth level of codevectors in the second codebook. The truncated address is then employed to retrieve from the second codebook, the codevector residing at the truncated address. The retrieved codevector is not an exact reproduction, but rather a substantial representation of the codevector selected at the transmitter location.

If, however, the number of levels L in the second codebook is equal to the number of levels N in the first codebook, then the obtained address is employed in its non-truncated form to retrieve from the second codebook the codevector residing at the obtained address.

The retrieved codevector in this case is an exact reproduction of the codevector selected at the transmitter location.

After retrieving the codevector from the second codebook (whether it be an exact reproduction or only a substantial representation of the codevector selected at the transmitter location), the retrieved codevector is employed to substantially re-create the image data at the receiver location. The accuracy or quality of the re-created image data is a function of the number L of levels in the second codebook. The re-created image data will be most accurate when L is equal to N. Thus, by allowing the user (e.g., a pay television subscriber) to choose the number of levels in the second codebook, the user can select the reproduction quality of the vector quantized image data. The ability to select the number of levels (and therefore the reproduction quality) is advantageous from the user's standpoint, because large codebooks (e.g. with many levels of codevectors) can be very expensive. With the method of the present invention, the user can select a codebook commensurate with his ability to pay.

In another embodiment, the method of the present invention is combined with a method known in the art as "reflected VQ." Briefly, multi-dimensional input vectors generally have a number of possible orientations. With "reflected VQ," each orientation is assigned an identifying code. Then, at least one of the orientations of the input vector is selected for comparison to the codevectors of the first codebook in accordance with a pre-selected criterion. A codevector that closely resembles at least one of the selected orientations is then selected from the codebook, and an indication of the selected codevector and the identifying code of the corresponding orientation of the input vector is transmitted.

The method of the present invention alone, or in combination with the "reflected VQ" method, further may be combined with a three-dimensional vector quantization method. With three-dimensional vector quantization, pixels are selected from a portion of each of a plurality of temporally spaced image frames. A three-dimensional input vector is then constructed from the pixels selected from each portion. Two dimensions represent the spatial relationship between pixels and the third dimension represents the temporal spacing between the pixels in adjacent image frames.

The present invention is also compatible with tree-search VQ in which a number of branches have been truncated from the tree, so that the number of branches at any node of the tree can be any number including zero.

Other features of the invention will become evident from the following drawings and specification.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings:

FIGS. 5a and 5b are flowcharts illustrating one preferred embodiment for carrying out the method of the present invention that allows users to select the reproduction quality of vector quantized data;

DETAILED DESCRIPTION OF THE EMBODIMENT

Before proceeding to the description of the drawings, it should be understood that, although the invention is described herein in the context of distributing television signals, such as movies and the like, in a pay television system, the present invention is in no way limited thereto. Rather, the present invention may be employed wherever it is desired to compress and transmit any type of data, including image data, voice data, etc. The term "pay television" and "pay television subscriber" is used in the instant specification and accompanying claims to encompass both cable television and direct broadcast satellite applications. However, as mentioned above, the invention is by no means limited to pay television systems, but has application to conventional (i.e., free) television transmission and reception.

Figure 1A:
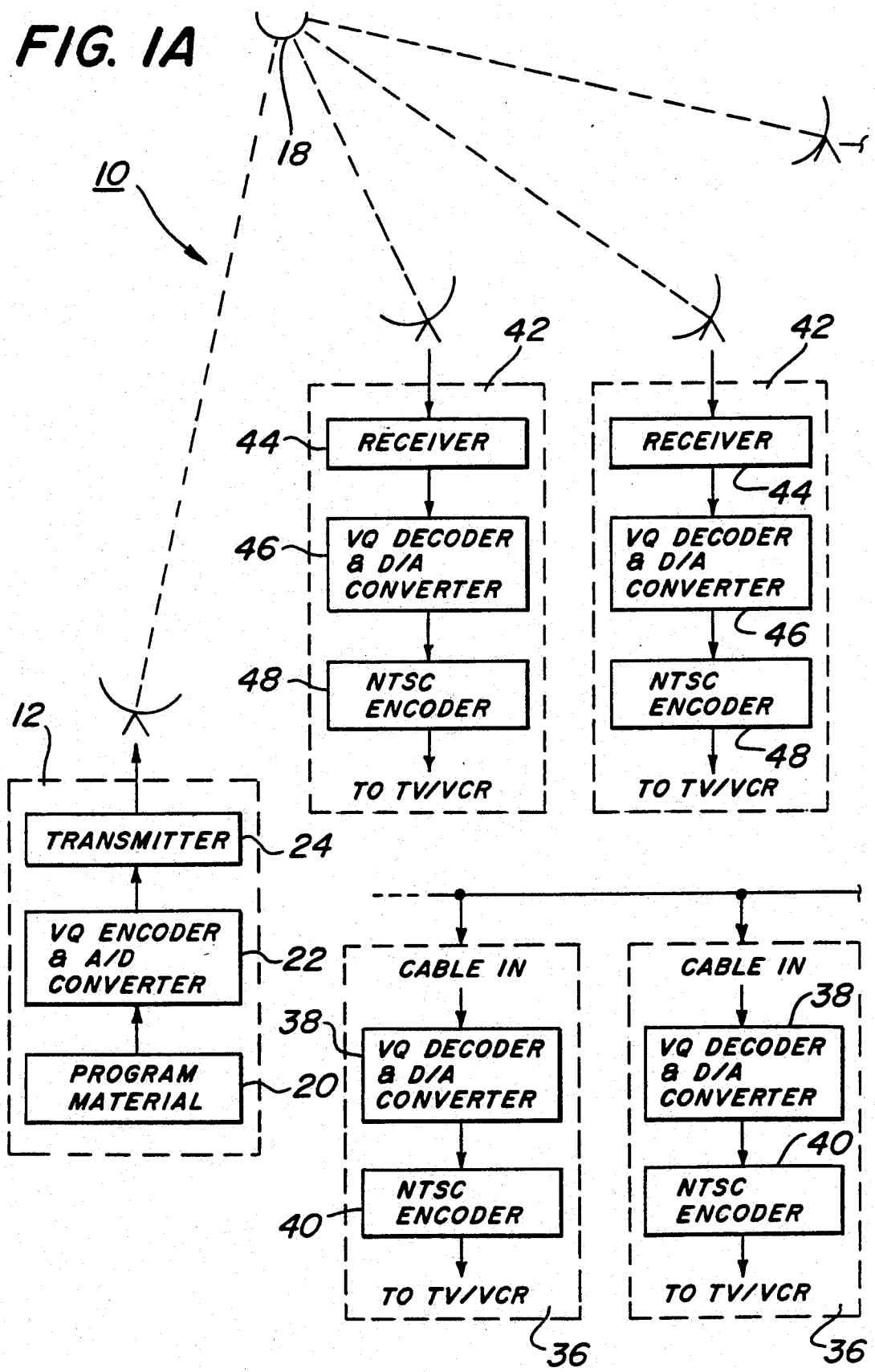
FIGS. 1a and 1b are block diagrams illustrating an exemplary application of the method of the present invention in a pay television system employing satellite communication to transmit program material.
Figure 1B:
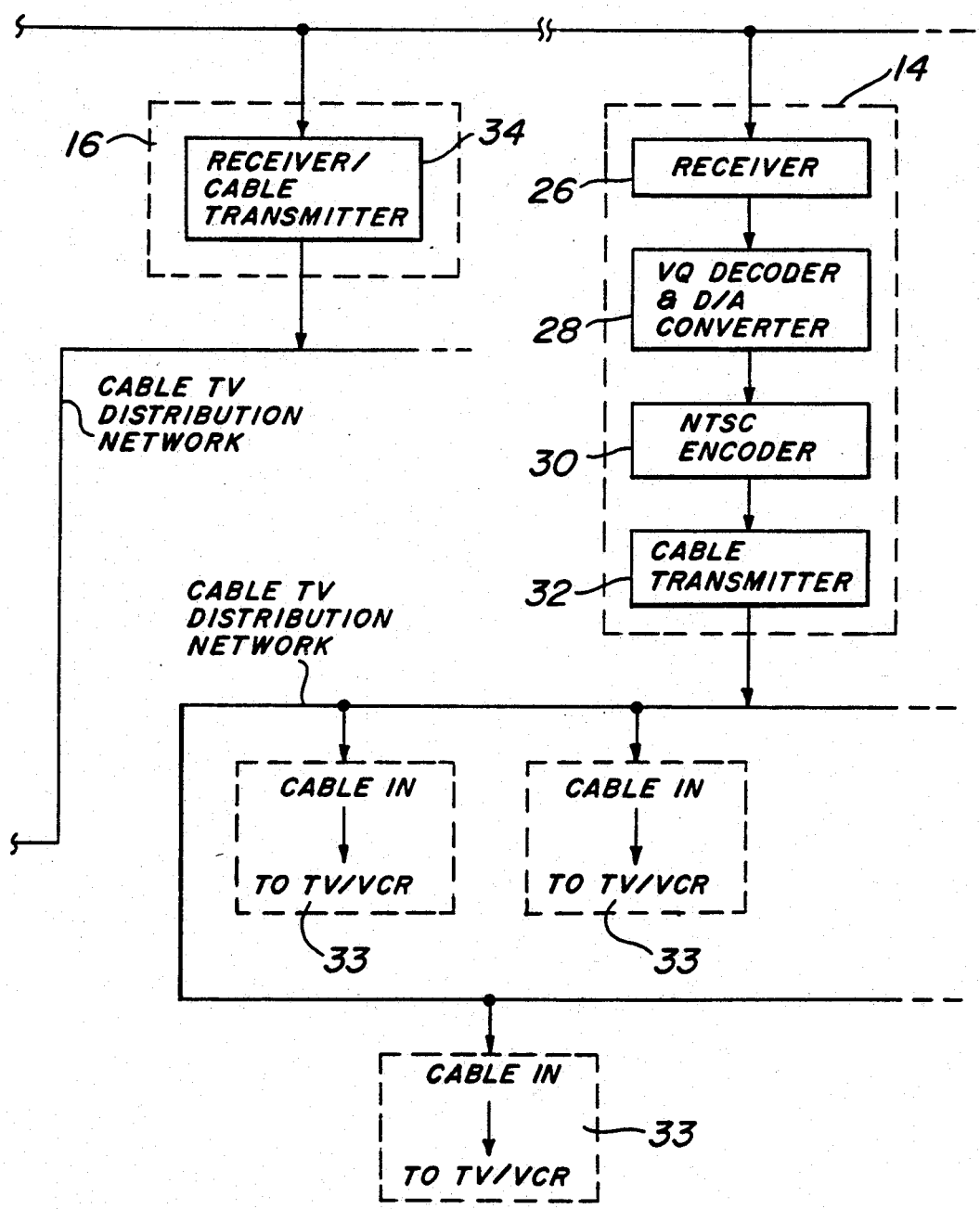

Referring now to the drawings, wherein like numerals indicate like elements, there is illustrated in FIGS. 1a and 1b a preferred embodiment of the present invention in a pay television system 10 employing satellite communication to transmit program material (e.g., television signals, such as movies, etc.) from a transmitter location of pay television signals 12 to receiving locations such as 14, 16 or 42. Typically, the transmitter location 12 might include a source 20 of program material that supplies movies, and the like in analog form to an apparatus (encoder) 22 for digitization and data compression by vector quantization. The details of a typical apparatus 22 can be found in Nasrabadi, N. M. and King, R. A., "Image Coding Using Vector Quantization: A Review", *IEEE Comm.*, Vol. 36, No. 8 (August 1988); Gray, R. M., "Vector Quantization", *IEEE ASSP Mag.*, Vol 1, pp. 4–29, (April 1984); and R. L. Baker, "Vector Quantization of Digital Images", Ph. D. Dissertation, Stanford University, Department of Electrical Engineering pp. 32-48 (1984). The apparatus 22 may be constructed as described in the above cited references, but modified in accordance with the teachings of the present invention. However, it is understood by those skilled in the art that the apparatus 22 may be constructed in any suitable manner without deviating from the spirit and scope of the present invention.

Compressed, digitized data is transmitted to a satellite 18, via transmitter 24, for reception by a plurality of earth stations such as 14, 16 or 42. The earth stations may be the cable head-end 14, 16 of a cable television distribution system of the type which receives signals from the satellite 18 and distributes them to a plurality of subscribers 33, 36 via coaxial cable. Alternatively, the earth stations may be DBS (direct broadcast satellite) subscribers 42 who receive signals directly from the satellite 18.

Referring only to the cable television application of FIG. 1a and 1b, there is shown two types of cable head-end installations 14, 16 that may receive the down-link from the satellite 18. The cable head-end installation 14 may employ the received data in a different manner than the cable head-end installation 16, however, the end result (availability of image data for display or recording) is the same to the cable television subscribers 33, 36 of the system 10. The two examples of cable head-end installations 14, 16 are shown to demonstrate the versatility of the present invention.

The cable head-end installation 14 may receive the data transmitted by the station 12 via receiver 26, then employ an on-site apparatus (decoder) 28 for decompressing the received data and converting the same back to analog form. The details of a typical apparatus 28 can be found in Gray, R. M., "Vector Quantization", *IEEE ASSP Mag.*, Vol 1, pp. 4-29 (April 1984). The apparatus 28 may be constructed as described in the above cited reference, but modified in accordance with the teachings of the present invention. However, it is understood by those skilled in the art that the apparatus 28 may be constructed in any suitable manner without deviating from the spirit and scope of the present invention. Another on-site apparatus 30 may convert the analog data to conventional NTSC signals for transmission over the cable to subscribers 33 in conventional form. Cable transmission is performed by the cable transmitter 32. Thus, in the case of cable head-end installation 14, the cable head-end operator distributes analog NTSC cable television signals to subscribers 33 in conventional form. Transformation from the compressed form to conventional NTSC form could also take place at any point in the cable system.

In the case of the cable head end installation 16, the data transmitted by station 12 may be received via a receiver/transmitter 34 that conditions the received data for transmission over a cable distribution network to cable television subscribers 36. That is, the operator of the cable head-end system 16 does not decode or decompress the received data, nor does it convert the same to analog form. Rather, the operator of the cable head-end system 16 simply transmits the compressed image data over a cable distribution network for receipt by the subscribers 36. The subscribers 36 of the system 16 must therefore be provided with VQ decoders 38, whereas subscribers 33 to the system 14 may employ conventional set-top decoders (not shown). The VQ decoders 38 decompress received data and convert the same to analog form. An apparatus 40, also provided to the subscribers 36 converts the analog data to NTSC format for display on a TV or recording on a VCR. The VQ decoder 38 and apparatus 40 may be embodied as a single set-top unit, or may be built into a television set or VCR.

While subscribers 36 to the system 16 must use the above-described decoder 38, an advantage of the system 16 is that, due to the highly compressed nature of the image data sent over the cable distribution network by the cable operator, many more channels may be transmitted over the cable to subscribers as may be transmitted over the cable in the system 14. Alternatively, the system 16 enables transmission of HDTV signals without sacrificing other channel space.

Alternatively, referring now to the DBS application of FIG. 1a, there is shown a plurality of DBS subscribers 42 that may receive the down-link from the satellite 18 directly. Each of the subscribers 42 is equipped with an apparatus (receiver) 44 for receiving the compressed program material and an apparatus (decoder) 46 (which may be identical to the decoder 38) for decompressing the received data and converting the same to analog form. Each subscriber 42 may also be provided with an apparatus 48 for placing the analog data into NTSC format for display on a television set or for recording via a VCR. As in the case of decoder 38 and apparatus 40, the decoder 46 and apparatus 48 may be embodied as either a set-top unit, or may be built into a television set or VCR.

Figure 2:
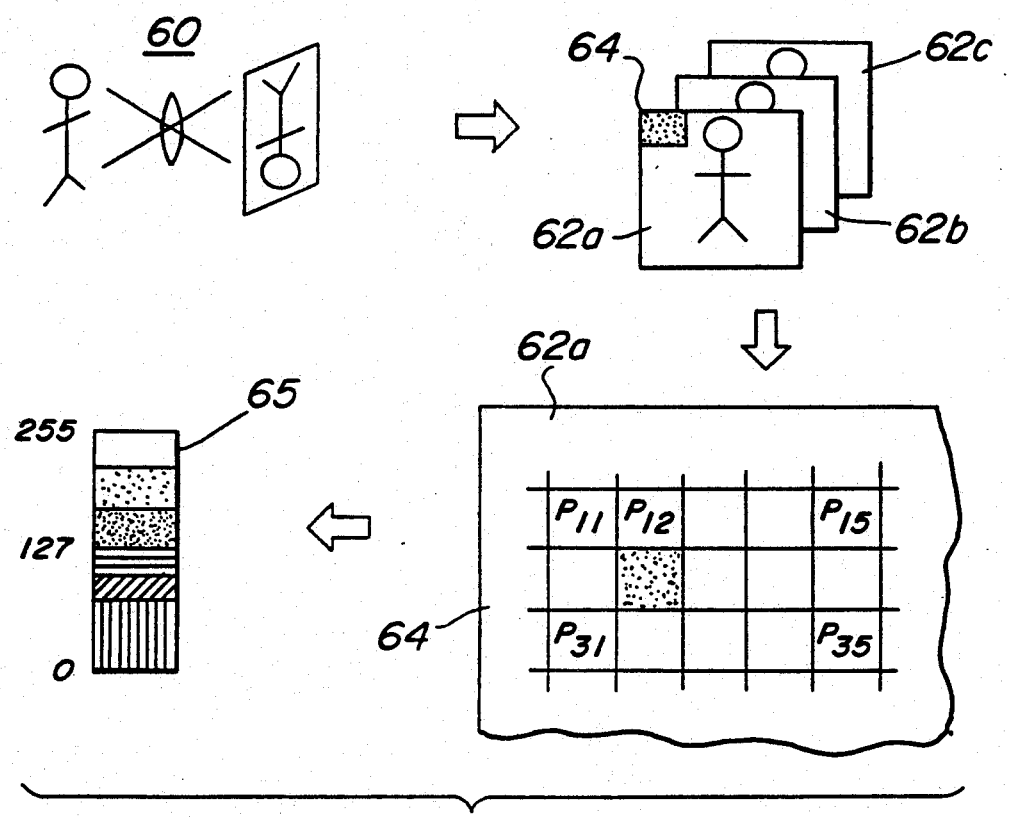
FIG. 2 graphically illustrates the concept of constructing input (image) vectors from pixels of image frames.
Figure 3:
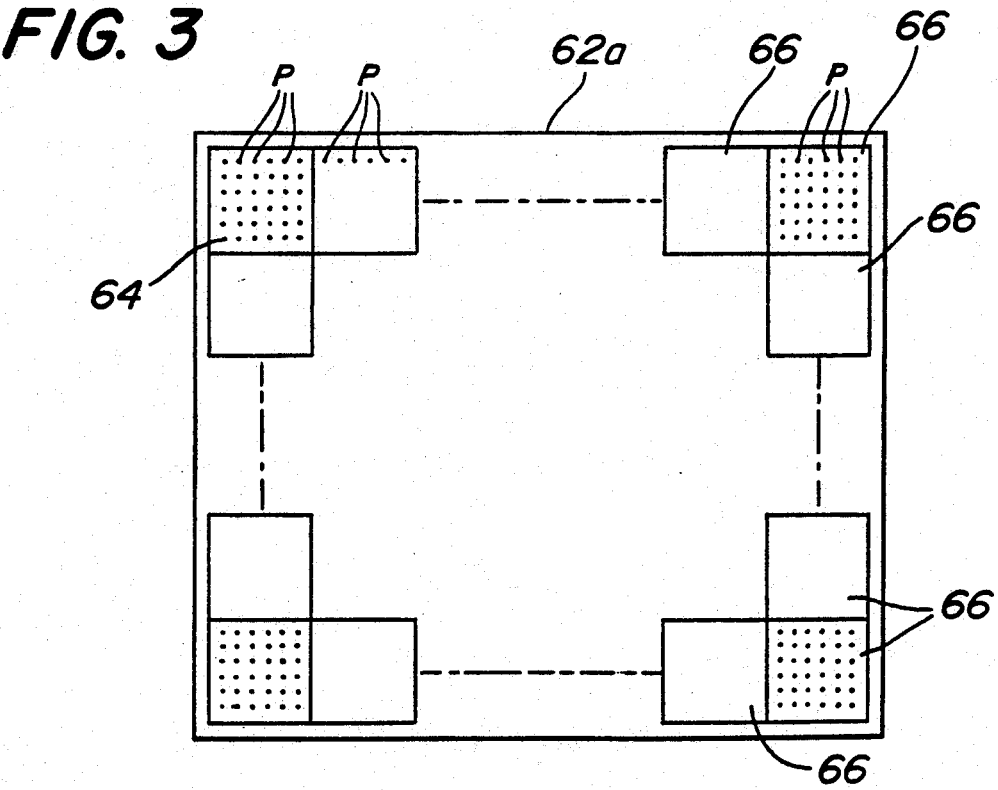
FIG. 3 graphically illustrates an image frame as defined by a plurality of pixels.

FIG. 2 illustrates the concept of converting moving or dynamic images 60, such as program material 20, into input image vectors for vector quantization. The concept illustrated in FIG. 2 is well known. See, for example, R. L. Baker, "Vector Quantization of Digital Images", Ph. D. Dissertation, Stanford University, Department of Electrical Engineering (1984); Gray, R. M., "Vector Quantization", *IEEE ASSP Mag.*, Vol. 1, pp. 4,29 (April 1984); Goldberg, M., Boucher, P. R. and Shlien, S., "Image Compression Using Adaptive Vector Quantization", *IEEE Comm.*, Vol. COM-34 No. 2 (February 1986); and, Nasrabadi, N. M. and King, R. A., "Image Coding Using Vector Quantization; A Review", *IEEE Comm.*, Vol. 36, No. 8 (August 1988). As shown in FIG. 3, and as is common in the art, each of the temporally spaced image frames 62a, 62b, 62c, etc. representing the moving image 60 is defined by a plurality of pixels P. In the case of a black and white image, each pixel P reports an intensity value, whereas in the case of a color image, each pixel may report luminance and chrominance values, or other values indicative of a color associated with the pixel.

As mentioned in the background section above, in vector quantization of an image frame, e.g., image frame 62a, the pixels P of each image frame are grouped into blocks that define sub-images 66 of each image frame. Each of these blocks, which is a matrix of pixels, defines an input image vector. Thus, in FIG. 2, a sub-image 64 of image frame 62a is represented by the block of pixels $P_{11}, P_{12}, \ldots P_{35}$. This matrix of pixels defines one input image vector for image frame 62a. Image frame 62a, as well as each succeeding image frame 62b, 62c, etc., will usually be represented by a plurality of input image vectors (ie., one input vector for each sub-image).

As graphically shown at 65 of FIG. 2, the intensity and/or color values reported by each pixel P are digitized. For example, each intensity or color value may be represented by an 8 bit digital word such that 256 intensity and/or color levels are possible for each pixel. Thus, in the case of a black and white image, only one input vector, containing the intensity values reported by each pixel in the block, is required for each block or sub-image. However, in the case of a color image, it may be desirable to provide several input image vectors for each block or sub-image, e.g., one input image vector containing intensity data and another containing color data. Another possibility is that three input image vectors are provided for each block in a color image, one containing Y data, another containing I data, and a third containing Q data. Alternatively, a three-dimensional vector quantization technique, described hereinafter, may be employed to construct a single input vector containing the data in each of these vectors.

It will be appreciated from the foregoing that, in the case of image data, input vectors will usually be multi-dimensional and usually have at least two dimensions (e.g., the matrix of intensity values shown in FIG. 2). However, there may be instances where input vectors are uni-dimensional, for example, where input vectors are constructed from the intensity values of only single rows or columns of pixels. Input vectors may have more than two dimensions, for example, where input vectors are constructed from pixel blocks of temporally spaced images (known as three dimensional vector quantization and described hereinafter in greater detail), and/or where data in addition to intensity data (e.g., color) is included in each vector.

As described in the background, each of the input image vectors is compared to the codevectors stored in a VQ codebook to select a best match codevector for each. In the preferred embodiment of the present invention, the encoders (e.g. encoder 22 of FIG. 1a) and decoders (e.g., 28, 38, and 46 of FIGS. 1a and 1b) each employ a tree search VQ codebook. The construction and use of tree search codebooks to perform vector quantization is well known in the art. See, for example, the aforementioned article by R. M. Gray entitled "Vector Quantization", and the aforementioned Ph.D. dissertation of R. L. Baker entitled "Vector Quantization of Digital Images". See also the aforementioned Ph.D. dissertation of E. A. Riskin entitled "Variable Rate Quantization of Images", and, U.S. Pat. No. 4,878,230 of Murakami et al. entitled, "Amplitude Adaptive Vector Quantization System." The aforementioned article by Linde, Buzo and Gray entitled "An Algorithm for Vector Quantizer Design" describes one preferred method for constructing codebooks that may be employed in the practice of the present invention.

As is known to those skilled in the art, a typical tree search VQ codebook comprises a plurality of levels of codevectors arranged in a tree structure wherein each codevector represents a possible input vector. The codevectors at each successive level of the tree usually represent possible input vectors with greater accuracy than codevectors at a preceding level, and successive levels of the tree contain more codevectors than preceding levels. Each codevector has an associated address which uniquely identifies the codevector and provides a means for accessing the codevector from the codebook. Additionally, the memory address of each codevector has a length which corresponds to the level of the tree at which the codevector resides. Thus, the memory addresses of codevectors at a same level have the same length, and the length increases with each successive level of codevectors.

Figure 4:
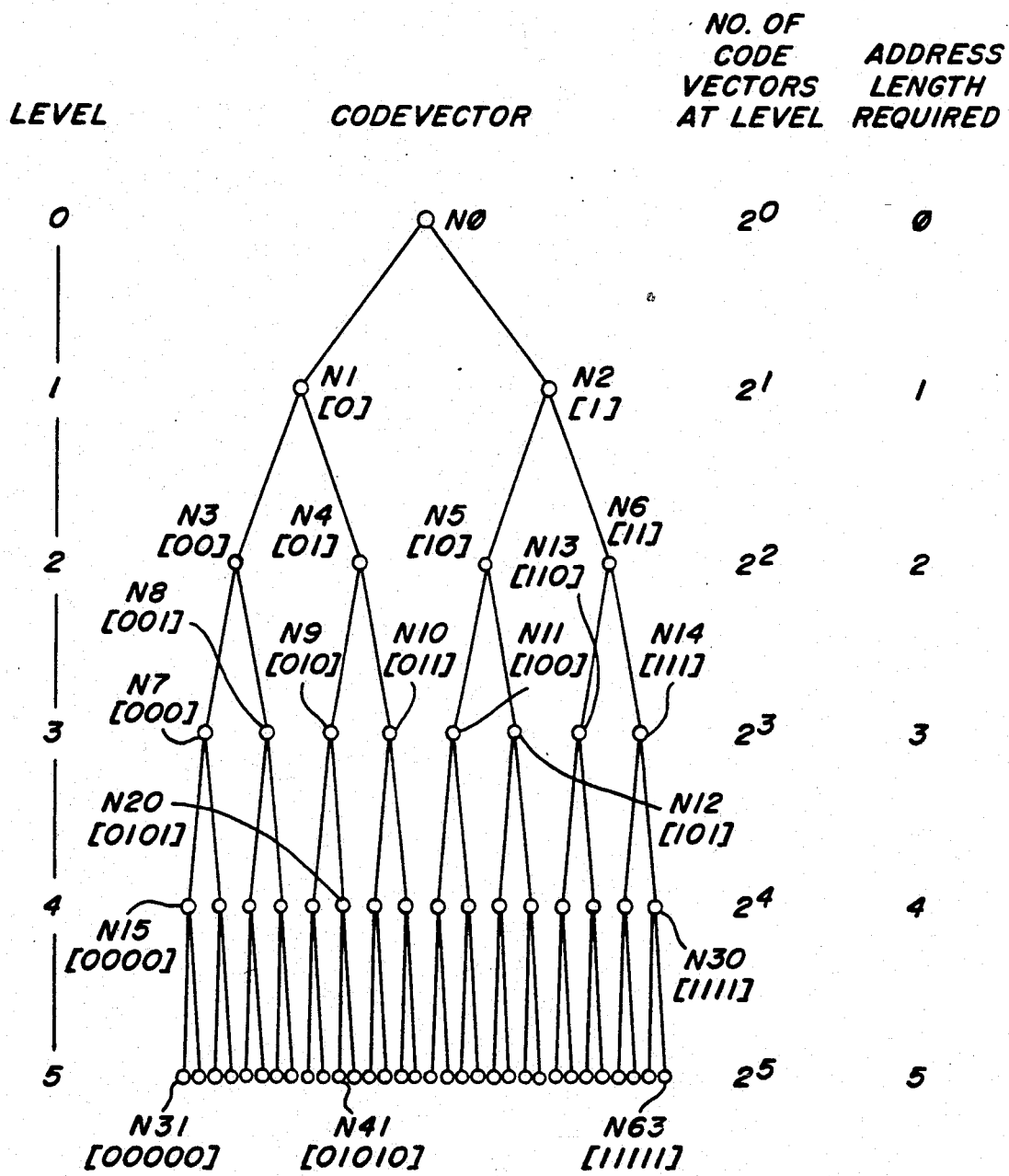
FIG. 4 illustrates the organization of an exemplary tree search VQ codebook that may be employed in connection with the practice of the present invention.

FIG. 4 graphically illustrates the structure of an exemplary tree search VQ codebook that may be employed in the present invention. As shown in the figure, the exemplary tree search VQ codebook comprises a plurality of levels 0-5 of codevectors wherein level 0 is defined by a root node N0 of the tree and subsequent levels are defined by additional nodes N1-N62 that are reached as branches of the tree are traversed. Each node is, of course, a codevector, so the exemplary codebook of FIG. 4 has 63 codevectors N0-N62.

As mentioned above, in typical tree search codebooks such as the codebook of FIG. 4, the codevectors at successive levels represent possible input vectors with greater accuracy than codevectors at a preceding level. Thus, for example, the codevectors at level 5 of the exemplary tree of FIG. 4 may represent possible input vectors with greater accuracy than the codevectors at level 4, and the codevectors at level 4 may represent possible input vectors with greater accuracy than the codevectors stored at level 3, and so on. Also, each codevector has an address associated therewith. Codevectors higher up in the tree (e.g., level 0 and 1) have shorter addresses than codevectors lower in the tree (e.g., levels 4 and 5), because there are fewer choices in the upper levels than in the lower levels. For example, an address length of 5 bits is required to address the $2^5$ codevectors in level 5, whereas an address length of only 3 bits is required to address one of the $2^3$ codevectors in level 3, etc. For purposes of later discussion and in the drawings, the addresses of some codevectors are indicated in brackets ("[]").

Considering the structure of a tree search codebook in greater detail and referring to the tree search codebook of FIG. 4 as an example, it can be seen that successive levels of the tree search codebook are formed by branches emanating from each node in a preceding level. Thus for example, from the root node N0, the first level of the tree search codebook of FIG. 4 is formed by the branches to N1 and N2; the second level is formed by the branches from N1 to N3 and N4 and the branches from N2 to N5 and N6. As shown in the Figure, two branches emanate from each node at a given level until the bottom level of the tree is reached. It is understood by those skilled in the art that while the tree search codebook of FIG. 4 has two branches emanating from each node, other tree search codebooks may be used in accordance with the present invention that have more branches emanating from each node, or the number of branches may vary from node to node.

The address length of each codevector depends upon the number of branches emanating from each node as well as the level of the tree at which the codevector resides. In typical applications, VQ codebooks are stored in a digital electronic memory wherein the addresses are binary. In general, then, the length of the binary address of a codevector at a given level (L) can be expressed as:

$$\text{Address Length} = L(\log_2 b) \text{ bits,}$$

where b = the number of branches emanating from each node. Thus, for example, in the tree search codebook of FIG. 4, where there are two branches emanating from each node, the codevectors of the first level of the codebook (residing at N1 and N2) require an address length of only 1 bit. The codevectors at each successive level of the tree search codebook of FIG. 4 require 1 additional address bit. The 5th level of the codebook, therefore, requires 5 address bits. Applying the formula above to a tree search codebook having four branches emanating from each node, each successive level of codevectors requires two additional address bits. Similarly, in a codebook having eight branches emanating from each node, each successive level of codevectors requires three additional address bits, and so on.

With binary addressing, the address of a codevector (node) at a given level of the tree comprises the address of the parent node in the preceding level plus the number of bits necessary to distinguish that codevector from the other codevectors (nodes) having the same parent node. As described above the number of additional bits depends on the number of branches emanating from the parent node and can be expressed as:

$$\log_2 b \text{ bits,}$$

where b=the number of branches emanating from the parent node. Thus, for example, referring to the tree search codebook of FIG. 4 wherein two branches emanate from each node, the address of the codevector at N4 is [01] which comprises the address of the codevector at parent node N1 ([0]) plus an additional bit ([1]) to distinguish the codevector at N4 from the codevector at N3 which also has node N1 as a parent. Similarly, for example, the address of the codevector at N9 is [010] which comprises the address of the codevector at parent node N4 ([01]) plus an additional bit ([0]) to distinguish the codevector at N9 from the codevector at N10 which also has node N4 as a parent.

A necessary result of the structure described above, which is most important to the method of the present invention, is that from the address of a codevector at a node in a lower level of the tree, the addresses of the codevectors at the parent nodes in preceding levels can be obtained by simply truncating the lower level address by $\log_2 b$ for each preceding level. Thus, for example, knowing the address of the codevector at N41 [01010] in the 5th level of the tree search codebook of FIG. 4, the address of the codevector at parent node N20 in the preceding 4th level is obtained simply by truncating the address of the codevector at N41 by 1 bit. Thus, the address of the codevector at parent node N20 is [0101] (ie. [01010] with the last bit removed). Similarly, the address of the codevector at the parent node N4 in the 2nd level of the tree can be obtained by truncating 3 bits (5-2) from the bottom level address. Thus, the address of the codevector at N4 is [01] (ie. [01010] with the last three bits removed).

As mentioned in the background, while tree search codebooks reduce search time (since only selected branches of the tree are traversed during a search), they require comparatively larger memories than full search codebooks to achieve a given level of distortion. The number of codevectors in a tree search codebook can be expressed mathematically as:

$$\Sigma b^L, \text{ for } L=1 \text{ to } N$$

where

N=total number of levels in the codebook;
L=the Lth level of the codebook; and
B=the number of branches emanating from each node of the codebook.

Thus, consider for example a tree search codebook having 10 levels and wherein 4 branches emanate from each node. Applying the formula above, the codebook would contain approximately 1.33 million codevectors. Suppose further, for example, that each codevector is constructed from a 3×4 matrix of pixels wherein each pixel represents an intensity value between 0 and 255. Each pixel would require 8 bits or 1 byte of memory storage, and therefore, each codevector would require 12 bytes of memory storage (3×4 pixels). Consequently, the codebook would require 16 Mbytes of storage—a significant amount of memory.

Note, however, that the 10th level of this hypothetical codebook contains $b^L = 4^{10} \approx 1$ million codevectors. An identical codebook with only 9 levels (i.e. the 10th level removed) would require only 4 Mbytes of memory (12 Mbytes less than the 10 level codebook). Thus, a significant reduction in codebook memory, and consequently a reduction in cost, can be achieved by employing a codebook with one less level of codevectors. However, reducing the number of levels of codevectors also reduces the reproduction quality of transmitted VQ data. Therefore, there is a tradeoff between cost and reproduction quality. In some instances, users may find that the reduced cost of a smaller codebook outweighs the reduced reproduction quality.

In the preferred embodiment, vector quantization is performed at the transmitter location by searching each input vector all the way through to the bottom of the tree to find the codevector at the bottom of the tree that most closely resembles the input vector. Thus, input vectors are always encoded from the bottom of the tree. It is understood by those skilled in the art that the tree is traversed by branching only from a selected node (codevector) at a given level to a node (codevector) at the next level along one of the branches emanating from the selected node. A detailed description of the tree search technique may be found in R. M. Gray and H. Abut, "Full Search and Tree Searched Vector Quantization of Speech Waveforms," *Proc. IEEE Int. Conf. Acoust., Speech, Signal Processing*, pp. 593-96 (May 1982), and R. M. Gray and Y. Linde, "Vector Quantization and Predictive Quantizers For Gauss Markov Sources", *IEEE Trans. Comm.*, Vol. COM-30, pp. 381-389 (February 1982), both of which are incorporated herein by reference. Briefly, tree-search VQ of an input vector (representing a block of image frame data to be transmitted) begins by comparing the input vector to the codevectors in the first level of the codebook to determine the codevector in that level that most closely resembles the input vector. Thus, referring to the exemplary tree search codebook of FIG. 4, the input vector is compared to the codevectors at N1 and N2. If, for example, the codevector at N1 most closely resembles the input vector, the input vector would be compared to the codevectors at N3 and N4 in the next level (but not to the codevectors at N5 and N6 since only the codevectors at nodes which branch from the preceding selected node are used for comparison). This process continues until the codevector at the bottom of the tree which most closely resembles the input vector has been determined. Data compression is achieved by transmitting an indication of the address of the selected bottom-level codevector rather than the input vector itself. A large degree of data compression is achieved because the address of a codevector is generally much smaller than an entire input vector. In the prior art, an identical tree search codebook having the same number of levels of codevectors is provided at each receiving location. The receiving location receives the transmitted indication and obtains therefrom the address of the selected codevector. The obtained address is then employed to retrieve the selected codevector from the codebook at the receiving location. Because the codebooks are identical, the retrieved codevector is identical to the codevector selected at the transmitter location, and consequently, closely resembles the input vector. From the reproduced input vector, the block of image data is re-created for display on a television set at the receiving location.

In the context of pay television systems, a problem arises in requiring that each receiver location (e.g. cable head-ends, cable subscribers and/or DBS subscribers) have an identical tree search codebook with the same number of levels as the codebook at the transmitting location: many subscribers cannot afford the codebooks due to the prohibitive cost of memory storage. The present invention overcomes this problem by providing a method of communicating image data from a first location to a second location wherein the first location (e.g. a transmitter location of pay television signals) employs a first vector quantization codebook having a plurality N of levels of codevectors, but wherein the second location (e.g. a receiver location of pay television signals such as a cable head-end, a cable subscriber or a pay television subscriber) employs a second codebook having a plurality L of levels of codevectors, where L is a user selectable number in the range of 1 to N. The codevectors of the L levels of the second codebook are identical to the codevectors of the corresponding first L levels of the first codebook. By allowing the user at the receiving location to select the number of levels in the codebook at that location, the user can choose a level of image reproduction quality (accuracy) that is commensurate with the users ability to pay. Furthermore, as the users ability to pay increases, or as the cost of codebook memory decreases, additional reproduction quality can be acquired by simply purchasing a codebook having more levels. As those skilled in the art will understand, the greatest reproduction quality is achieved when L is equal to N.

Figure 5B:
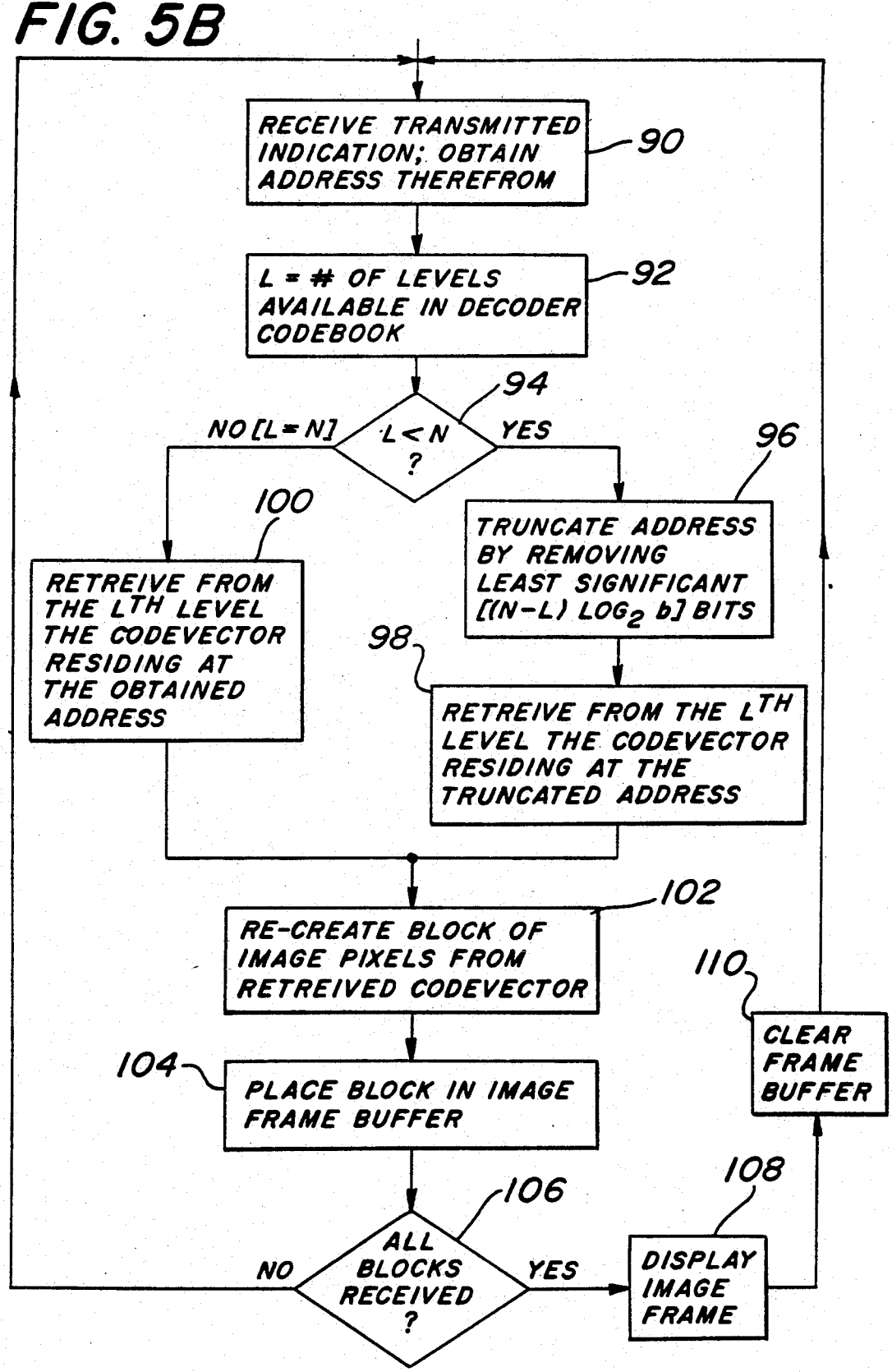

Referring to FIGS. 5a and 5b, the method of the present invention will now be explained in detail, as preferably embodied in a pay television system (such as that shown in FIGS. 1a and 1b). FIG. 5a is a flowchart illustrating the steps performed at a transmitter location (not shown) of pay television signals. FIG. 5b is a flowchart illustrating the steps performed at each of a plurality of receiving locations (not shown). A first tree search vector quantization codebook having a plurality N of levels of codevectors is provided in a memory located at the transmitter location. Each succeeding level of codevectors in the first codebook represents possible input vectors with greater accuracy than codevectors at a preceding level. A memory address is associated with each codevector and as discussed above, each address has a length corresponding to the level at which the respective codevector resides. Thus, the addresses of codevectors at a same level have the same length and the lengths increase with each successive level. A second tree search vector quantization codebook having a plurality L of levels of codevectors is provided in a memory at each receiving location. The number L of levels is a user selectable number in the range of 1 to N. The codevectors of the L levels of the second codebook at each receiving location correspond to the first L levels of the first codebook on a one to one basis. Furthermore, each of the codevectors of the second codebook is identical to the corresponding codevector of the first codebook.

Referring now to FIG. 5a, in step 70, an image frame to be transmitted is received. Control then passes to step 72 where, in the manner described in detail above, the image frame is organized into blocks or matrices of pixels. Next, in step 74, a block is selected for transmission and control passes to step 76. In step 76, the block is converted to a multi-dimensional input vector. Control then passes to step 78 wherein the input vector is compared to the codevectors in the first codebook. In the preferred embodiment, comparison continues until the Nth level of the codebook is reached. Then, in step 80, the codevector at the Nth level that most closely resembles the input vector is selected. Next, in step 82, at least an indication of the address of the selected codevector is transmitted. Recall that data compression is achieved because the length of the codevector address (in bits) is generally much less than the length of the input vector.

Control next passes to step 84 wherein a determination is made as to whether all the blocks in the current image frame have been compressed and transmitted. If not, control passes to step 74 wherein a new block is selected and steps 76 through 82 are repeated for the new block. If it is determined in step 84 that all of the blocks in the current image frame have been processed, control passes back to step 70 wherein the next temporally adjacent image frame is received for transmission.

Referring now to FIG. 5b, at a receiving location, the transmitted indication is received in step 90 and the address of the codevector selected in step 80 (at the transmitter) is obtained therefrom. Next, in step 92, the decoder at the receiving location determines the number of levels L of codevectors available in the second codebook. It is understood by those skilled in the art that the decoder would not have to make an actual determination, ie., the number of levels in the decoder preferably would be hard-wired into the decoder circuitry (not shown). In step 94, if the number L of levels in the second codebook is less than the number N of levels in the first codebook, control passes to step 96, but if the number L of levels in the second codebook is equal to the number N of levels in the first codebook, control passes to step 100.

In the situation where the $L<N$, control passes to step 96. Because the codevector selected in step 80 (at the transmitter) is selected from the Nth level of the first codebook, the obtained address is capable of addressing up to an Nth level in the second codebook. In situations where $L<N$, there is no Nth level in the second codebook. Recall from the previous discussion, however, that the addresses of codevectors in preceding levels of a codebook can be obtained by truncating the addresses of codevectors in the lowest level of the codebook. Thus, in step 96, the obtained address is truncated for addressing only up to the Lth level of codevectors in the second codebook. Because the L levels of the second codebook are identical (including codevector addresses) to the first L levels of the first codebook, the second codebook contains the first L parent nodes of the selected codevector. With binary addressing, and where b=the number of branches emanating from each node, the address of the Lth level parent node, can be obtained by truncating the obtained address by $(N-L)\log_2 b$ bits. After truncation, control passes to step 98.

In step 98, the codevector residing at the truncated address is retrieved from the Lth level of the second codebook. As is understood by those skilled in the art, the retrieved codevector is not an exact reproduction of the codevector selected in step 80 (because preceding levels of codevectors represent possible input vectors with less accuracy than lower levels), but nevertheless is a substantial representation of that codevector.

Figure 6:
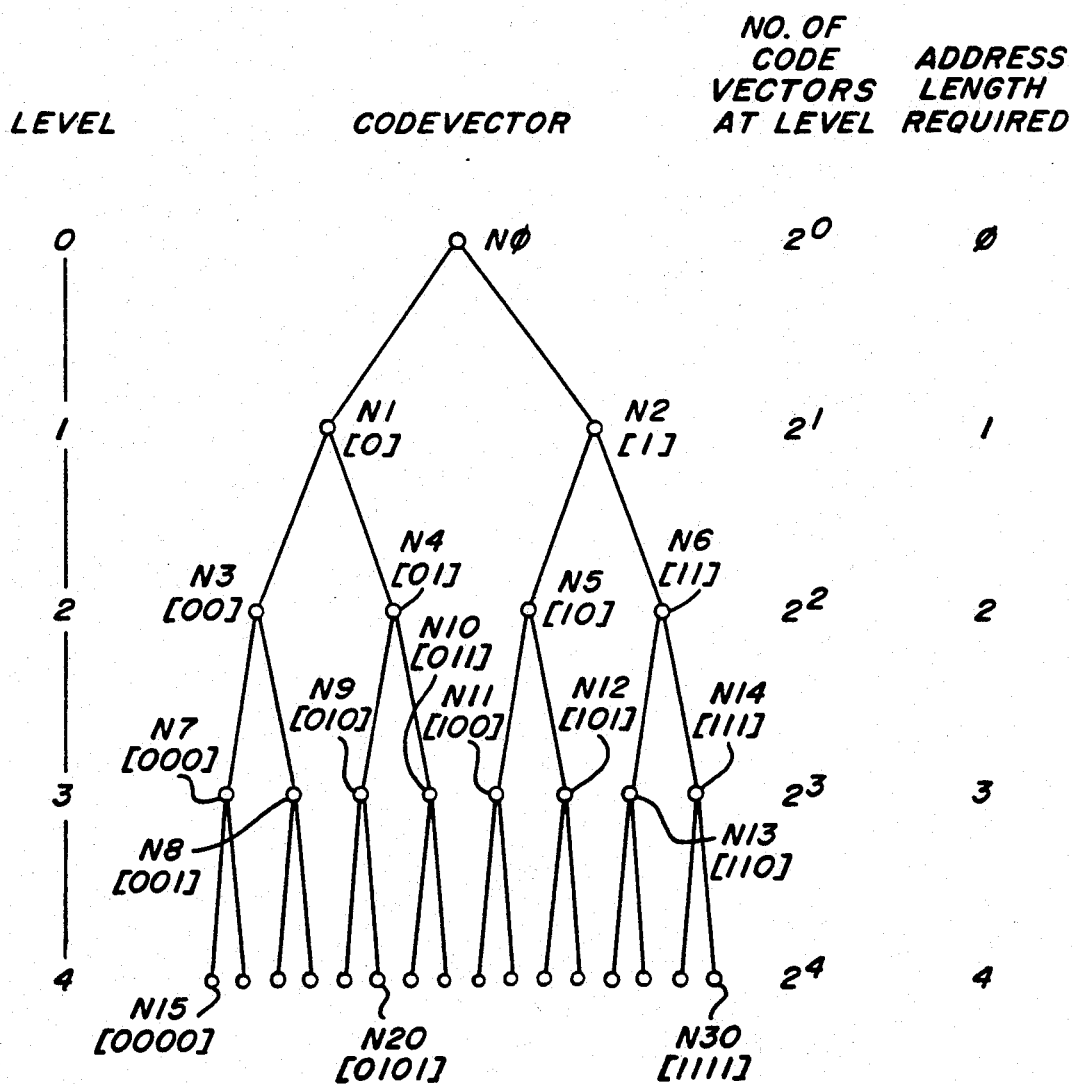
FIG. 6 illustrates the organization of a tree search VQ codebook wherein the codevectors of each level of the codebook are identical to the codevectors of the corresponding levels of the codebook of FIG. 4.

In greater detail, for example, suppose the tree search codebook at the transmitter location is the codebook of FIG. 4 having 5 levels of codevectors, and that the second codebook at the receiver location is the codebook of FIG. 6 having 4 levels of codevectors. The 4 levels of the codebook of FIG. 6 are identical to the first 4 levels of the codebook of FIG. 4. Suppose further that the codevector residing at N41 in the 5th level of the first codebook is selected as most closely resembling the input vector, and that an indication of the address of that codevector [01010] is transmitted in step 82. At the receiver location, the indication is received in step 90 and the address [01010] is obtained therefrom. Because the number of levels (4) in the second codebook is less than the number of levels (5) in the first codebook, control will pass from step 94 to step 96.

As can be seen from FIG. 4, the parent nodes of node N41 include N20, N9, N4 and N1. Referring now to FIG. 6, it can be seen that while the second codebook does not contain a node N41 (because the 5th level is unavailable), the second codebook does contain nodes N20, N9, N4 and N1. The codevector at N20 will be the next most accurate representation of the input vector. Thus, in step 96, the obtained address [01010] is truncated by 1 bit (i.e. (N-L)log$_2$b, where N=5, L=4 and b=2) to produce the truncated address [0101] which is the address of the codevector at parent node N20. Control then passes to step 98.

In step 98, therefore, the codevector at N20 (in FIG. 6) will be retrieved from the second codebook. As discussed, the retrieved codevector is a less accurate representation of the input vector than the codevector selected in step 80. However, because the L level codebook requires less memory, the reduced accuracy is offset by the lower cost of the decoder.

It is understood that, in practice, the address truncation in step 96 can be implemented in many ways. For example, the obtained address could be received into a shift-register and then the required number of bits could be shifted out of the register into a second register which would hold the truncated address. However, without deviating from the spirit and scope of the present invention, the truncation can be implemented in any of the many ways.

Referring again to FIG. 5b, if the number of levels L of the second codebook is equal to the number of levels N of the first codebook (i.e. L=N), control passes to step 100. Because the second codebook contains the same number of levels as the first codebook, the codevector selected in step 80 is available in the second codebook. Thus, the obtained address can be employed in a non-truncated form (i.e., as it was received) to retrieve from the Lth (Nth) level of the second codebook the codevector residing at the obtained address to identically reproduce the codevector selected in step 80.

Control then next passes from either step 100 (L=N) or step 98 (L<N) to step 102. In step 102, the codevector obtained in step 100 or 98 is employed to substantially re-create the block of image data at the receiving location It is understood by those skilled in the art that the accuracy of the re-creation will be a function of the number of levels L in the second codebook; the recreation being most accurate where L=N.

In step 104, the re-created image block is placed in an image frame buffer, and control passes to step 106. A determination is made in step 106 as to whether all the image blocks of the current image frame have been received (i.e. whether the buffer is full). If all the blocks have been received, control passes to step 108 wherein the image frame is displayed on a television set at the receiver location. Then, in step 110, the frame buffer is cleared and control passes to step 90 to receive the first transmitted indication of the next image frame. However, if it is determined in step 106 that not all of the blocks of the current image have been received, control passes directly to step 90 to receive the next transmitted indication of the current image frame.

Although, in the preferred embodiment described above, the method of the present invention employs a frame buffer at the receiving location, a frame buffer is not required. That is, it is not necessary to store a complete image frame. A smaller store could be used of size equal to a single row of image vectors. Alternatively, the vector address itself can be stored and used to recover video samples from the codebook on a sample by sample basis, thereby eliminating the image store.

The foregoing method is repeated for as long as the receiver location desires to display the transmitted image data.

Figure 7:
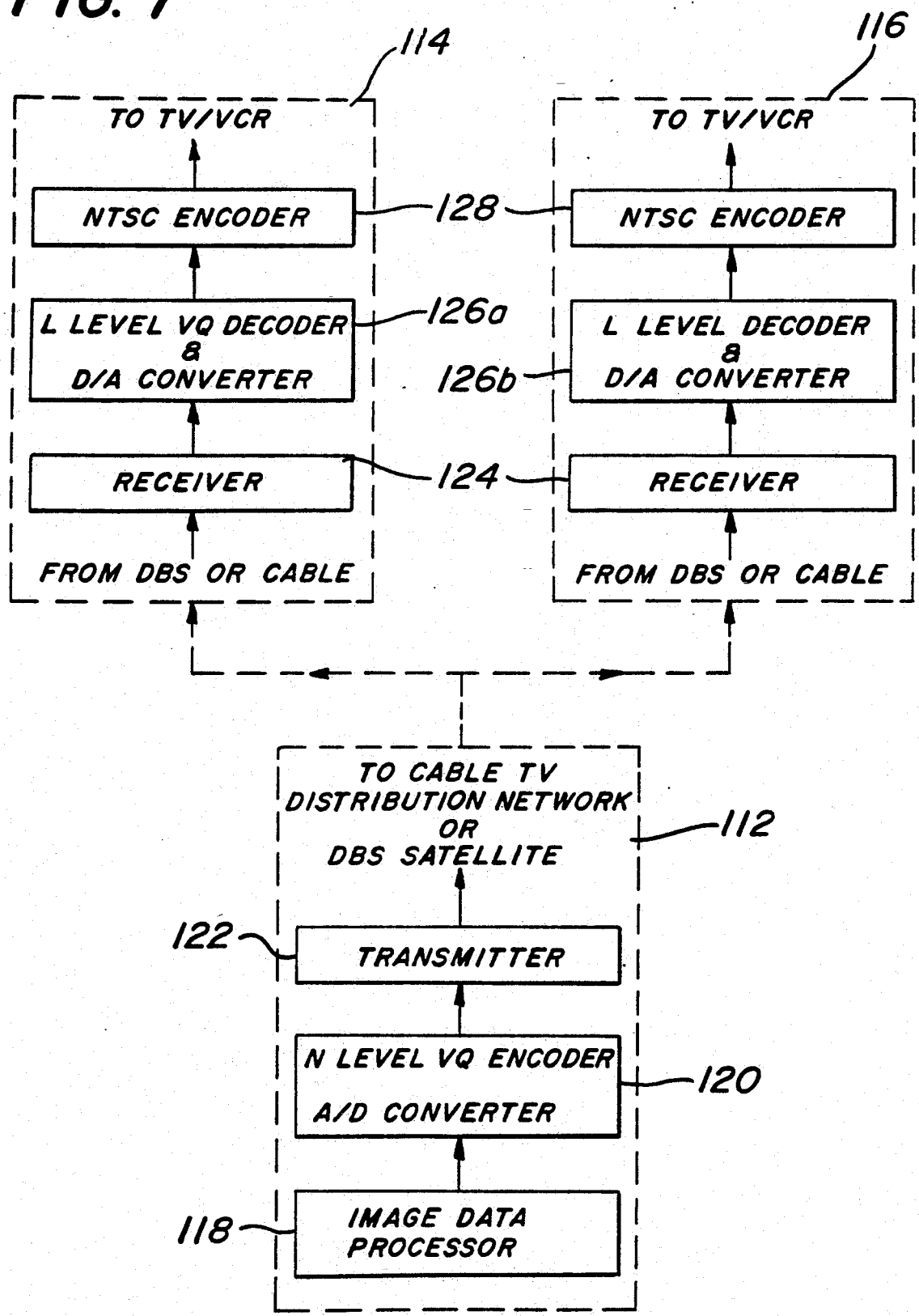
FIG. 7 is a block diagram of a pay television system embodying the method of the present invention.

Referring now to FIG. 7, there is shown a block diagram of a pay television system embodying the method of the present invention. The pay television system comprises a transmitter of pay television signals 112 and a plurality of pay television receivers, e.g. 114, 116. The system is for transmitting data indicative of temporally spaced image frames representing moving pictures to the plurality of receivers 114, 116, wherein each image frame comprises a plurality of blocks of image data.

The transmitter 112 includes a means for receiving blocks of image data to be transmitted, and for converting each block of image data to a multi-dimensional input vector. In the preferred embodiment, the means for receiving and for converting is an image data processor 118. The transmitter also includes a vector quantization encoder 120 employing a first tree search codebook having N levels of codevectors. Each codevector represents a possible input vector and has an associated address. The encoder 120 compares each input vector to the codevectors of the first codebook and selects for each input vector the codevector in the Nth level that most closely resembles the input vector. The transmitter of pay television signals 112 further includes a transmitter 122 for transmitting indications of at least the addresses of the selected codevectors to a plurality of pay television receivers 114, 116 via either DBS satellite of a cable distribution network.

Each of the pay television receivers 114, 116 includes a means 124 for receiving the transmitted indications from the transmitter and obtaining the address from each indication. Each pay television receiver 114, 116 also includes a vector quantization decoder 126 employing a second tree search codebook having L levels of codevectors, where L is a subscriber selectable number in the range of 1 to N. The codevectors of the L levels of the second codebook of each receiver 114, 116 are identical to the codevectors of a corresponding first L levels of the first codebook.

The decoder 126 places the obtained addresses in a form for addressing up to the Lth level of codevectors in the second codebook. The decoder 126 also retrieves the codevectors residing at the obtained addresses from the second codebook to obtain a representation of the codevectors selected at the transmitter 112. Because the number L of levels in the second codebook of each of the pay television receivers 114, 116 is user selectable, different ones of the receivers may have a different number L of levels in their respective codebooks. Thus, for example, the decoder 126 of receiver 114 may employ a codebook with a different number of levels L than the decoder 126 of receiver 116. However, the number L of levels is always in the range of 1 to N.

Finally, each of the pay television receivers 114, 116 includes a means for employing the retrieved codevectors to substantially re-create the blocks of image data for display on a television set at a locale of each receiver. The means for employing the retrieved codevectors is shown in FIG. 7 as an NTSC encoder 128.

In another embodiment of the present invention, the method described above and illustrated in FIGS. 5a and 5b can be combined with a method known in the art as "reflected VQ". See, e.g., R. L. Baker, "Vector Quantization of Digital Images", Ph.D. Dissertation, Stanford University, Department of Electrical Engineering 153–62 (1984), which is incorporated herein by reference. Briefly, "reflected VQ" takes advantage of the symmetry commonly found in image data. For example, note that, in the case of entertainment television, the mirror image on the y-axis of a television picture is often (but not always) another valid image. Symmetry about the x-axis is also sometimes present, but somewhat less so. As a result of this symmetry, a typical sequence of two-dimensional image frames often will contain sub-images (i.e., smaller blocks of pixels) that are substantial mirror images of each other about either the x-axis, the y-axis or both. Consequently, a single vector can represent each of these sub-images by simply mirroring the vector accordingly. As those skilled in the art understand, when the sub-images are rectangular, one vector can represent up to four symmetrical sub-images by mirroring the vector about the x-axis, y-axis or both. When the sub-images are square, one vector can represent up to eight sub-images because in addition to mirroring about the x-axis and y-axis, the vector can be rotated 90 degrees.

"Reflected VQ" takes advantage of the symmetry described above to achieve a reduction in codebook size. For example, consider a vector quantizer that organizes image frames into rectangular sub-images. Because of image frame symmetry, four visually different sub-images in effect may be the same sub-image simply mirrored about the x-axis, y-axis or both. Consequently, an input vector constructed from one of these sub-images can be used to represent each of the other sub-images by mirroring the vector accordingly. Different mirror images of a vector are referred to as "orientations" of the vector. Thus, an input vector constructed from a rectangular sub-image has four possible orientations; a first orientation being representative of the original sub-image, a second orientation being representative of the sub-image mirrored about the x-axis, a third orientation being representative of the sub-image mirrored about the y-axis, and a fourth orientation being representative of the sub-image mirrored about the x-axis and y-axis (an input vector constructed from a square sub-image has 8 possible orientations because in addition to mirroring, the vector can be rotated 90 degrees).

Rather than employing a codebook that contains codevectors for all orientations of an input vector, "reflected VQ" employs a codebook that contains codevectors for only one input vector orientation; in other words the codebook contains codevectors all having one general orientation. Then, prior to comparing an input vector to the codebook, the input vector is re-oriented, if necessary, such that its orientation matches the general orientation of the codevectors in the codebook. After selecting the codevector which most closely resembles the re-oriented input vector, an indication of the address of the selected codevector is transmitted along with additional information specifying the "reflections"/"mirroring" necessary to recover the original orientation of the input vector.

At the receiving end, the selected codevector is retrieved from the receiver codebook and re-oriented to match the original orientation of the input vector, thereby reproducing the input vector in its original orientation. Thus, in this manner, four visually different input vectors (representing mirror images of the same rectangular sub-image) can be reproduced at the receiving location using a single codevector. By storing codevectors in only a single orientation, approximately a 4-to-1 reduction in codebook size can be achieved assuming two-dimensional rectangular sub-images; when square sub-images are employed approximately an 8-to-1 reduction in codebook size can be achieved.

Figure 8:
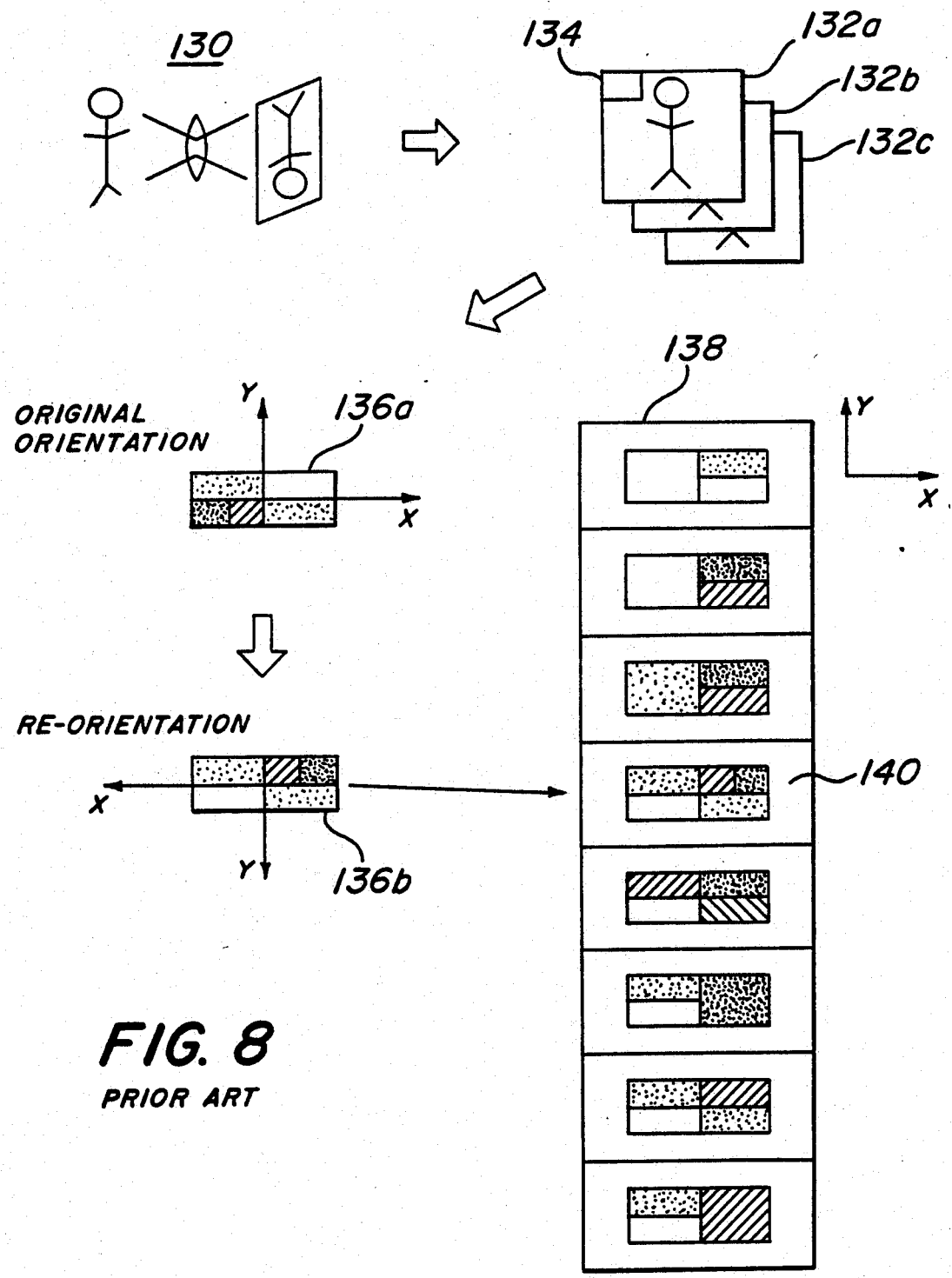
FIG. 8 graphically illustrates a prior art vector quantization method employing mirrored input (image) vectors for searching a codebook.

The "reflected VQ" method is illustrated graphically in FIG. 8. Moving images 130 are converted to a plurality of temporally spaced image frames, 132a, 132b, 132c, etc. Vector quantization begins by receiving the image frames 132 and organizing each frame into blocks (sub-images) of pixels (not shown). The conversion of one block (sub-image) 134 to a multi-dimensional input vector 136a is shown. Input vector 136a is in its original orientation (i.e., the orientation representing the sub-image of pixels substantially as received). As mentioned above, because a single input vector having a number of possible orientations can be used to represent several visually different sub-images that are actually mirror images of each other, a VQ codebook need only store codevectors in one orientation. Accordingly the codevectors in the codebook 138 of FIG. 8 all have the same general orientation. As mentioned above, by storing only codevectors in a single orientation, approximately a 4-to-1 reduction in codebook size can be achieved (assuming two-dimensional rectangular sub-images).

The orientation of a codevector may be defined, for example, by the average spatial gradient of pixels in the codevector. For example, each codevector in the codebook 138 of FIG. 8 has an average spatial gradient which is positive along the x-axis from left-to-right (a positive gradient being defined generally as a spatial progression from light to dark pixels) and positive along the y-axis from bottom to top. The direction of the gradient along the x-axis and y-axis defines the orientation. It is understood by those skilled in the art that other quantities can be used to define orientation, and the present invention is not limited to any one definition.

Note, the spatial gradient along the x-axis of the input vector in its original orientation 136a is negative (from right-to-left). Similarly the gradient along the y-axis is negative (from bottom-to-top). Thus the original orientation of the input vector 136a does not match the orientation of the codevectors in the codebook 138. Consequently, as best shown in the figure, there is no codevector that closely resembles the input vector 136a. Therefore, according to the method of "reflected VQ," the input vector 136a must be re-oriented to match the orientation of the codevectors in the codebook 138. In the case of input vector 136a, the vector must be re-oriented along both the x-axis and the y-axis. As mentioned above, re-orientation involves mirroring the input vector about the respective axes. As those skilled in the art will understand, mirroring a two-dimensional vector such as input vector 136a about the x-axis and y-axis simply involves reversing the order of the vectors columns and rows. Re-orientation can be performed by an apparatus such as that disclosed in R. L. Baker, "Vector Quantization of Digital Images", Ph.D. Dissertation, Stanford University, Department of Electrical Engineering 157 (1984). Re-orientation of the input vector 136a results in the same input vector having a different orientation 136b. As can be seen from the figure, the re-oriented input vector 136b has positive spatial gradients along both axes. Thus, the orientation of the re-oriented vector 136b now matches the orientation of the codevectors in the codebook 138.

The re-oriented input vector 136b can now be compared with the codevectors in the codebook 138. As illustrated in FIG. 8, the comparison produces one codevector 140 that closely resembles the re-oriented input vector 136b. According to the method, this codevector 140 is then selected, and an indication of the address of the selected codevector is transmitted along with additional information specifying the "reflections/mirroring" necessary to recover the original orientation of the input vector. At receiving locations (each employing a VQ decoder), the selected codevector is retrieved from an identical codebook and re-oriented to match the original orientation of the input vector, thereby re-creating the input vector in its original orientation.

Figure 9:
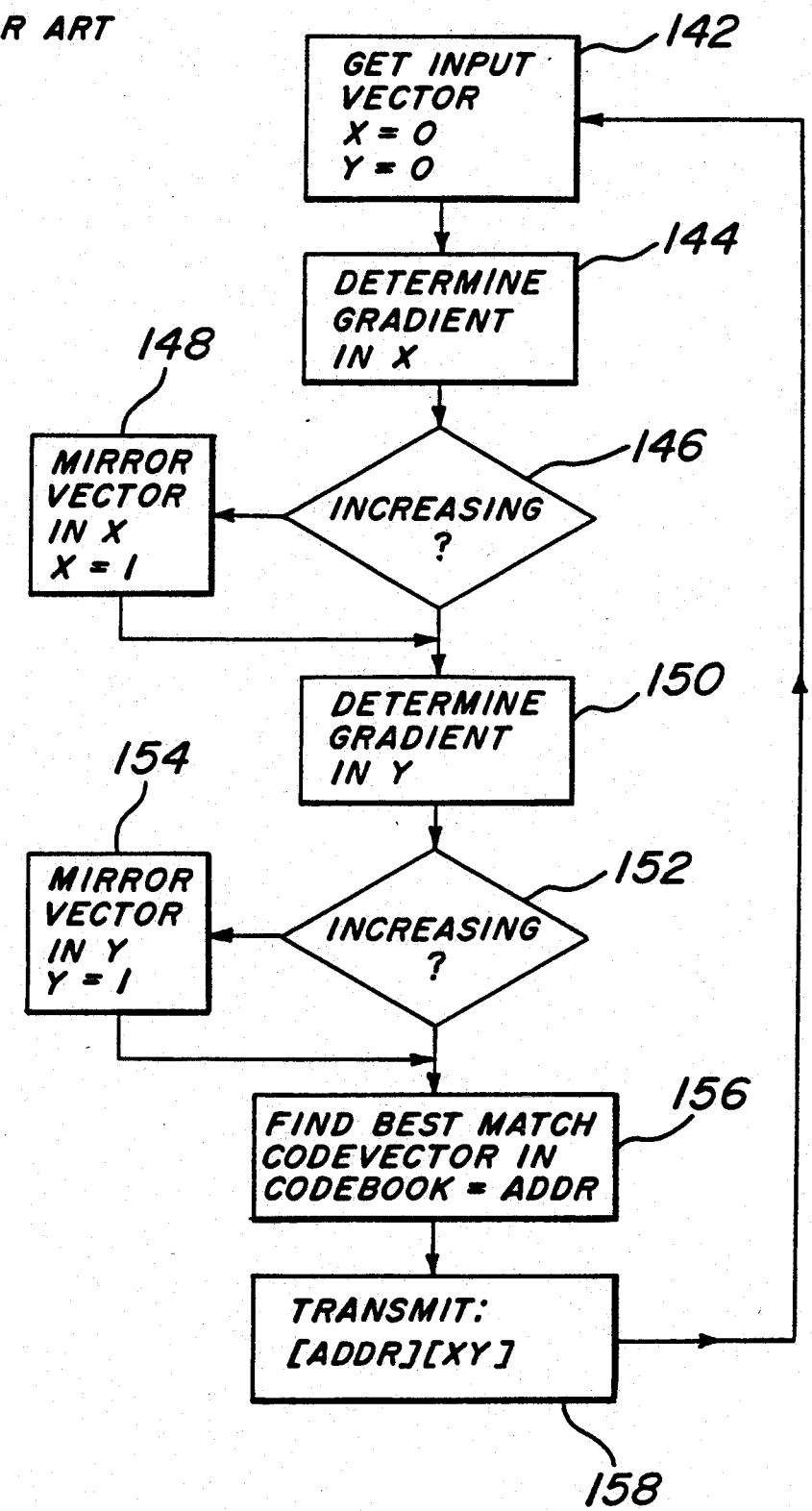
FIG. 9 is a flowchart illustrating the prior art vector quantization method of FIG. 7 in greater detail.

FIG. 9 is flowchart illustrating the "reflected VQ" method in greater detail. In the figure, an input vector is received in step 142 and the variables x and y are initialized to a value of 0. Variables x and y define an identifying code assigned to each of the possible orientations of the input vector (e.g., $x=0, y=0$ is the identifying code assigned to the original orientation of the input vector). Control then passes to step 144 where the spatial gradient of the input vector along the x-axis is calculated. A method of calculating the gradient of an input vector is disclosed in R. L. Baker, "Vector Quantization of Digital Images", Ph.D. Dissertation, Stanford University, Department of Electrical Engineering 160-61 (1984). Assume for the purposes of this description that the codevectors in the codebook are all oriented as described in FIG. 8 (i.e. positive from left-to-right along the x-axis and from bottom-to-top along the y-axis) and that the codebook is a tree-search codebook having N levels of codevectors.

Control next passes to step 146 where the spatial gradient of the input vector along the x-axis (determined in step 144) is examined to determine whether it is positive along the x-axis (i.e., the same as the codevectors in the codebook). If so, then the x-axis orientation of the input vector, as originally received, already conforms to the orientation of the codevectors in the codebook. If the gradient is zero (i.e. neither negative nor positive), then as is understood by those skilled in the art, the input vector itself is generally symmetrical about the x-axis. In such situations, obtaining a mirror image of the input vector about the x-axis would not substantially alter the gradient. The x-axis orientation in such situations is therefore treated as if it conforms to the x-axis orientation of the codevectors in the codebook. Accordingly, for the case of a positive or zero x-axis gradient, the input vector is unchanged and control passes to step 150. If the x-axis gradient is negative, however, control passes to step 148 where the input vector is re-oriented by obtaining a mirror image of the input vector about its x-axis. Thus, the re-oriented vector will have an positive x-axis gradient which matches the x-axis orientation of the codebook. The variable x is set to 1 identifying the x-axis re-orientation of the input vector. Control then passes to step 150.

At step 150, the y-axis gradient of the input vector is determined in a manner similar to that of step 144. Control then passes to step 152. As with the x-axis gradient, if the y-axis gradient of the input vector is positive (i.e. matches the codebook gradient) or zero, the input vector is unchanged and control passes to block 156. If, however, the y-axis gradient is negative, control passes to step 154 where the input vector is re-oriented about the y-axis such that it then conforms with the y-axis gradient of the codebook. Also in step 154, the variable y is set to 1 identifying the y-axis re-orientation of the input vector. Thus, as a result of any necessary re-orientations, the input vector now has an orientation that matches the orientation of the codevectors in the codebook. Control next passes to step 156.

In step 156, the input vector is compared to the codevectors in the codebook. The codevector most closely resembling the input vector is selected from the Nth level of the codebook. Control then passes to step 158 wherein an indication of the address of the selected codevector and the identifying code (x,y) of the current input vector orientation is transmitted to a plurality of receiving locations.

As described above, each receiving location employs a VQ codebook, and in the preferred embodiment, the codebooks at the receiving locations have L levels of codevectors where L is a user selectable number in the range of 1 to N. At each receiving location, the transmitted indication is received and the address of the codevector selected in step 156 is obtained. The obtained address is then employed in either a truncated ($L<N$) or non-truncated ($L=N$) form to retrieve the codevector residing at that address from the codebook. The identifying code, which identifies the re-orientations, if any, performed on the original input vector, is then employed to re-orient the retrieved codevector such that its orientation matches the original orientation of the input vector. Thus, the input vector (in its original orientation) is reproduced at the receiving location, and from the reproduced input vector, the block (subimage) of pixels, which the input vector represents, can be re-created for display on a television.

Further description of the "reflected VQ" method, as well as the implementation of apparatus employing the method, can be found in R. L. Baker, "Vector Quantization of Digital Images", Ph.D. Dissertation, Stanford University, Department of Electrical Engineering 153-62 (1984).

In yet another embodiment, the method of the present invention, alone or as combined with the "reflected VQ" method, may be further combined with a method known in the art as three-dimensional VQ. In three-dimensional VQ, a three-dimensional input vector is constructed from identical portions of a plurality of temporally spaced image frames. Three-dimensional VQ is a method well known to those skilled in the art.

Figure 10:
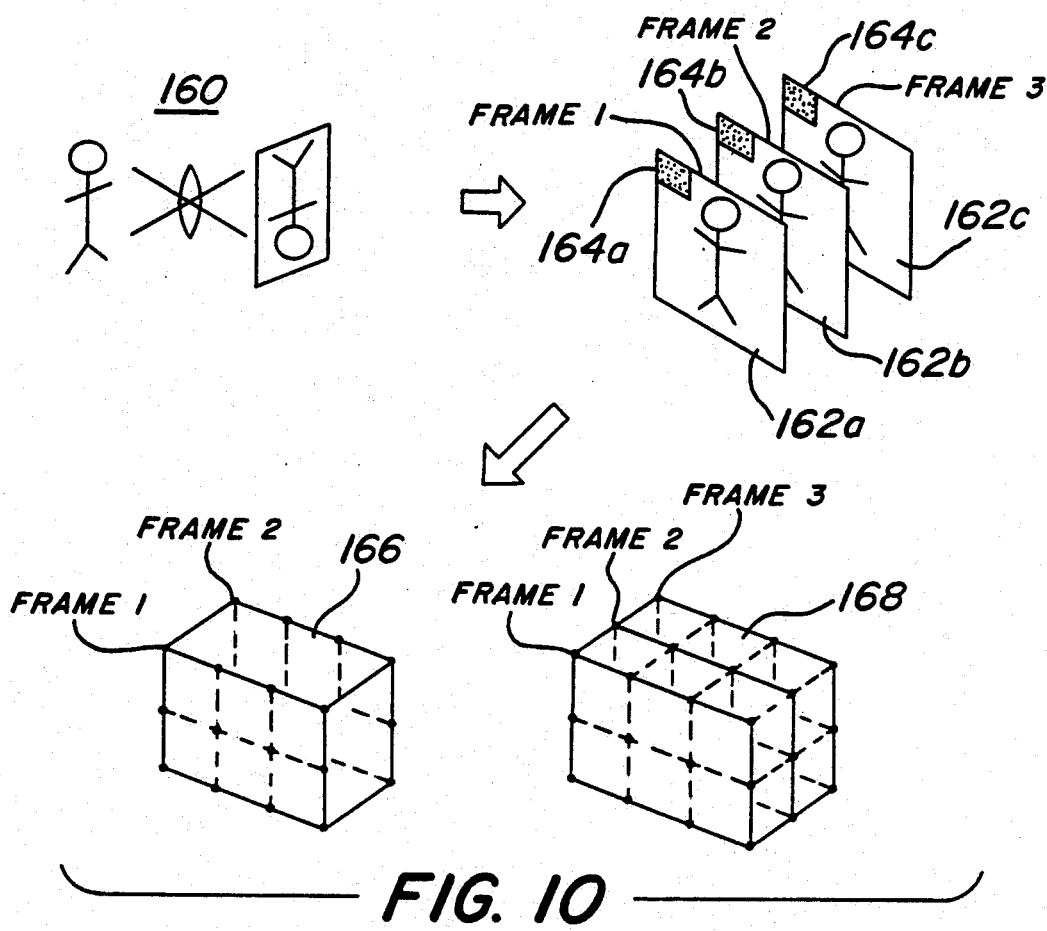
FIG. 10 graphically illustrates the concept of constructing a three-dimensional input vector from identical portions of a plurality of temporally spaced image frames.

FIG. 10 illustrates the concept of converting moving or dynamic images 160 into a plurality of temporally spaced image frames 162a, 162b, 162c, etc. In three-dimensional VQ (hereinafter 3D-VQ), pixels are selected from identical portions 164 of more than one of the temporally spaced image frames 162. A three-dimensional input vector is then constructed from the selected pixels. Thus, for example a three-dimensional input vector 166 can be constructed from identical portions 164a, 164b of two of the temporally spaced image frames 162a, 162b respectively. Alternatively, a three-dimensional input vector 168 could be constructed from identical portions 164a, 164b, 164c of three of the temporally spaced image frames 162a, 162b, 162c respectively. It is understood by those skilled in the art that a three-dimensional input vector can be constructed from identical portions of any number of temporally spaced image frames. Image frames are typically two-dimensional and have an x-axis and a y-axis. The third dimension, or z-axis, of a three-dimensional input vector represents the temporal spacing between adjacent image frames.

As mentioned above, 3D-VQ and "reflected VQ" can be combined together with the method of the present invention. Recall from above that the sub-images of a typical image frame or group of image frames often exhibit x-axis and/or y-axis symmetry. With a plurality of temporally spaced image frames, there can be temporal symmetry as well; objects within an image have almost equal probability of moving to the left or right, up or down, etc. As a result, there is often a high degree of symmetry along the temporal or z-axis of a three-dimensional input vector. Thus, in addition to mirroring a three-dimensional input vector about the x-axis and the y-axis, the three-dimensional input vector can be mirrored about the z-axis as well.

Figure 11:
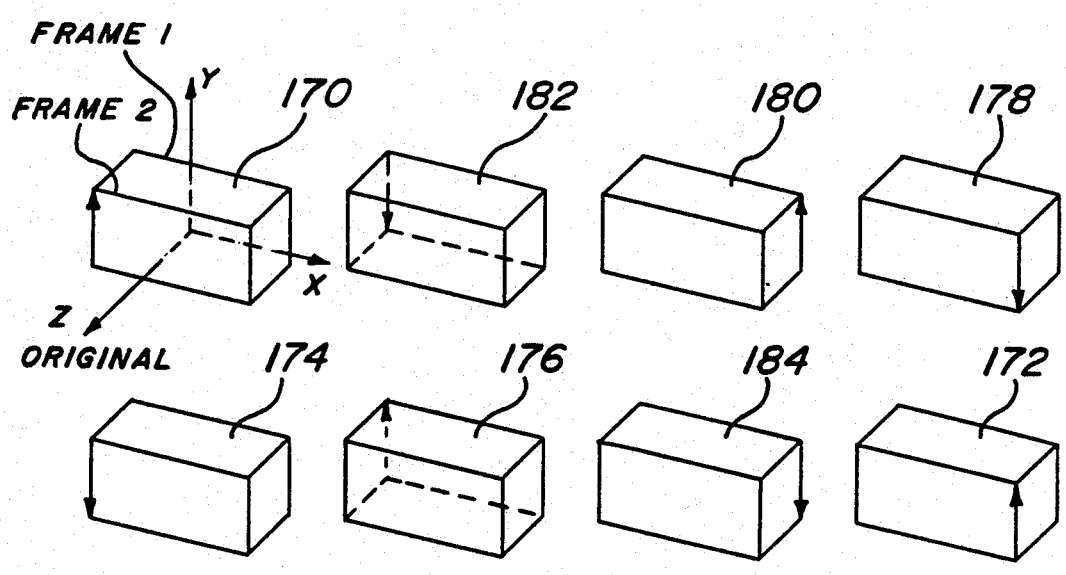
FIG. 11 graphically illustrates the concept of mirroring a three-dimensional input vector about the x-axis, the y-axis, and the z-axis to obtain eight possible orientations of the input vector.

A three-dimensional rectangular input vector (i.e., where the portions of each image frame are rectangular), such as 166 or 168, has 8 possible orientations. FIG. 11 illustrates the 8 possible orientations. The original input vector 170 can be mirrored about the x-axis 172, the y-axis 174, the z-axis 176, the x-axis and y-axis 178, the x-axis and z-axis 180, the y-axis and z-axis 182, or all three 184. It is understood by those skilled in the art that a three-dimensional cubic input vector (i.e. where the portions of each image frame are squares) has 32 possible orientations because the input vector can be rotated in addition to mirroring. It is also understood by those skilled in the art that the present invention is not limited to rectangular or cubic input vectors; any three-dimensional input vector structure may be employed.

By combining portions of temporally spaced image frames, 3D-VQ generally achieves a higher degree of image compression. Furthermore, when 3D-VQ is combined with "reflected VQ", a further reduction in the size of the VQ codebooks can be achieved (e.g., 8-to-1 instead of 4-to-1 for rectangular vectors).

The method of the present invention has been described above as being carried out in the spatial domain, i.e., the codevectors stored in the codebooks are representative of the spatial placement of the pixels in each image frame, and the input vectors constructed from the image frame data are representative of the spatial placement of an actual block of pixels from an image frame. However, the invention is not limited to implementation in the spatial domain. The invention may also be carried out in the transform, or frequency, domain wherein, instead of storing spatial codevectors as above described, their transforms are calculated and the transformed codevectors are stored in the codebook. For example, each codevector would be replaced by its cosine (Fourier) transform, and each input vector would be transformed prior to searching the codebook. In this case, the codebook would still be constructed as described above, but entries would correspond to the transformed vector space. Thus, in the encoder at a transmitter location, the tree search would be carried out in the transform domain. However, the decoders at the receiver locations could remain unchanged, i.e., the codebook in each decoder could continue to operate in the spatial domain. The advantage of this approach is that it is believed that it would result in fewer "block" artifacts commonly found in VQ encoder/decoder schemes. From the foregoing description, it can be seen that the present invention comprises a method for selecting the reproduction quality of transmitted vector quantized data. The present invention also encompasses the method for selecting reproduction quality in combination with a method known as "reflected VQ". Additionally, the method of the present invention, alone or as combined with "reflected VQ", may further be combined with three dimensional VQ. It will be appreciated by those skilled in the art that changes could be made to the embodiments described above without departing from the broad inventive concepts thereof. It is understood, therefore, that this invention is not limited to the particular embodiments disclosed, but is intended to cover all modifications which are within the scope and spirit of the invention as defined by the appended claims.

What is claimed is:

1. A method of communicating image data from a first location to a second location, comprising the steps of:

(a) receiving image data to be transmitted, and converting the image data to an input vector;

(b) defining a first codebook having a plurality N of levels of codevectors, the codevectors at each succeeding level of the first codebook representing a possible input vector with generally greater accuracy than the codevectors at a preceding level, each of the codevectors having an address associated therewith, and utilizing up to at least a selected level of the codevectors for comparison to the input vector;

(c) selecting from the selected level the codevector that most closely resembles the input vector;

(d) transmitting from the first location an indication of at least the address associated with the selected codevector; and (e) performing the following steps at the second location:

(i) providing a second codebook having a plurality L of levels of codevectors, where L is a user selectable number between 1 and N inclusive, the codevectors of the L levels of the second codebook being substantially identical to the codevectors of a corresponding L levels of the first codebook, and identifying a selected level of the codevectors of the second codebook;

(ii) receiving the transmitted indication from the first location, obtaining the address therefrom, and placing the obtained address in a form for addressing up to the selected level of the codevectors of the second codebook;

(iii) retrieving from the second codebook the codevector residing at the obtained address to obtain a representation of the codevector selected in step (c);

(iv) employing the codevector retrieved in step (iii) to substantially re-create the image data at the second location.

2. Method according to claim 1 wherein the selected level of the first codebook is the Nth level.

3. Method according to claim 1 wherein the first and second codebooks are tree search vector quantization codebooks.

4. Method according to claim 1 wherein the codevectors of the L levels of the second codebook correspond to the codevectors of the first L levels of the first codebook on a one to one basis, and wherein the codevectors of the second codebook are substantially identical to corresponding codevectors of the first codebook.

5. Method according to claim 1 wherein the re-created image data has an accuracy, and the accuracy is a function of the number L of levels in the second codebook, the re-created image data being most accurate when L is equal to N.

6. Method according to claim 1 wherein the address of each codevector in the first codebook has a length corresponding to the level at which that codevector resides such that the addresses of the codevectors at a same level have a same length and the lengths increase with each successive level.

7. Method according to claim 6 wherein the selected level of the first codebook is the Nth level thereof, and the selected level of the second codebook is the Lth level thereof, and L is less than N, and the obtained address is capable of addressing up to an Nth level of codevectors, and wherein step (e)(ii) and (e)(iii) comprise the steps of:

(i') truncating the obtained address for addressing only up to the Lth level of codevectors in the second codebook; and (ii') retrieving from the Lth level of the second codebook the codevector residing at the truncated address to obtain the representation of the codevector selected in step (c).

8. Method according to claim 1 wherein the first location is a transmitter location of cable television signals, and wherein the second location is a reception site in a cable television distribution network, and wherein the number L of levels provided in the second codebook is selected by a cable operator.

9. Method according to claim 9 wherein the re-created image data is encoded in NTSC format and retransmitted from the reception site to a plurality of cable television subscribers over the cable television distribution network.

10. Method according to claim 1 wherein the first location is a transmitter location of pay television signals and wherein the second location is the location of a pay television subscriber, and wherein the number L of levels provided in the second codebook is selected by the pay television subscriber.

11. Method according to claim 8 or 10 wherein the indication is transmitted from the first location to the second location via satellite.

12. Method according to claim 1 wherein the image data comprises temporally spaced image frames representing moving images, and each image frame is defined by a plurality of pixels, and wherein step (a) comprises:

(a') receiving a plurality of temporally spaced image frames to be transmitted;

(b') selecting pixels from a portion of each of the temporally spaced image frames; and (c') constructing the input vector from the pixels selected from said portions.

13. Method according to claim 12 wherein the pixels are selected from a substantially identical portion of each of the temporally spaced image frames.

14. Method according to claim 1 wherein input vector has P possible orientations, and wherein steps (c) and (d) further comprise the steps of:

(a') assigning an identifying code to each of the orientations;

(b') defining a codebook search technique wherein at least one of the orientations is compared to the codevectors of the first codebook in accordance with a pre-selected criterion;

(c') applying the defined technique to select one of the codevectors of the first codebook; and (d') transmitting an indication of the identifying code of the selected orientation and the address of the selected corresponding codevector, and wherein step (e) further comprises obtaining the identifying code from the transmitted indication and employing the identifying code and the representation of the codevector selected in step (c) to re-orient, if necessary, the representation of the codevector so as to substantially re-create the image data.

15. Method according to claim 1 wherein the image data comprises temporally spaced image frames representing moving images, and each image frame is defined by a plurality of pixels, and wherein step (a) comprises:

(a') receiving data indicative of each image frame to be transmitted;

(b') organizing each image frame data into blocks of pixels; and (c') converting each block of pixels into the input vector.

16. Method according to claim 15 wherein each pixel has an associated intensity value and the received image data is digital data indicative of at least the intensity value of each pixel, and further wherein at least some of the input vectors comprise the digital intensity value data for a rectangular block of pixels in the image frame.

17. Method according to claim 15 wherein each image frame is a color image frame, and each pixel within each image frame has at least associated luminance and chrominance values, at least some of the input vectors being representative of the luminance and chrominance values of a block of pixels in the image frame.

18. A method of communicating image data from a first location to a second location, comprising the steps of:

(a) receiving image data to be transmitted, and converting the image data to an input vector;

(b) providing a first codebook having a plurality N of levels of codevectors, the codevectors at each succeeding level of the first codebook representing a possible input vector with generally greater accuracy than the codevectors at a preceding level, there being an address associated with each of said codevectors, the address of each of said codevectors having a length corresponding to the level at which that codevector resides such that the addresses of codevectors at a same level have a same length and the lengths increase with each successive level;

(c) comparing the input vector tot he codevectors at each level of the first codebook until the Nth level has been reached and selecting from the Nth level the codevector that most closely resembles the input vector;

(d) transmitting from the first location an indication of at least the address associated with the selected codevector; and (e) performing the following steps at the second location:

(i) providing a second codebook having a plurality L of levels of codevectors, where L is a user selectable number between 1 and N inclusive, the codevectors of the L levels of the second codebook being substantially identical to the codevectors of a corresponding L levels of the first codebook;

(ii) receiving the transmitted indication from the first location, and obtaining the address therefrom, the obtained address being capable of addressing up to an Nth level of codevectors in the second codebook;

(iii) performing the following steps (1) and (2) when the number L of levels in the second codebook is less than the number N of levels in the first codebook, but preceeding to step (iv) below when the number of levels L in the second codebook is equal to the number of levels N in the first codebook:

(1) truncating the obtained address for addressing only up to the Lth level of codevectors in the second codebook; and (2) retrieving from the Lth level of the second codebook the codevector residing at the truncated address to obtain a representation of the codevector selected in step (c), and proceeding to step (v);

(iv) employing the obtained address in a non-truncated form to retrieve from the Lth level of the second codebook the codevector residing at the obtained address to substantially reproduce the codevector selected in step (c);

(v) employing the codevector obtained in step (iii)(2) or (iv) to substantially re-create the image data at the second location.

19. Method according to claim 18 wherein the first and second codebooks are tree search vector quantization codebooks.

20. Method according to claim 18 wherein the re-created image data has an accuracy, the accuracy being a function of the number of levels L in the second codebook, the re-created image data being most accurate when L is equal to N.

21. Method according to claim 18 wherein the first location is a transmitter location of cable television signals and wherein the second location is a reception site in a cable television distribution network, and wherein the number L of levels provided in the second codebook is selected by a cable operator.

22. Method according to claim 21 wherein the re-created image data is encoded in NTSC format and retransmitted from the reception site to a plurality of cable television subscribers over the cable television distribution network.

23. Method according to claim 18 wherein the first location is a transmitter location of pay television signals and wherein the second location is the location of a pay television subscriber, and wherein the number L of levels provided in the second codebook is selected by the pay television subscriber.

24. Method according to claim 21 or 23 wherein the indication is transmitted from the first location to the second location via satellite.

25. Method according to claim 18 wherein the image data comprises temporally spaced image frames representing moving images, and each image frame is defined by a plurality of pixels, and wherein step (a) comprises:

(a') receiving a plurality of temporally spaced image frames to be transmitted;

(b') selecting pixels from an identical portion of each of the temporally spaced image frames; and (c') constructing the input vector from the pixels selected from said portions.

26. Method according to claim 18 wherein the input vector has P possible orientations, and wherein steps (c) and (d) further comprise the steps of:

(a') assigning an identifying code to each of the orientations;

(b') defining a codebook search technique wherein at least one of the orientations is compared to the codevectors of the first codebook in accordance with a pre-selected criterion;

(c') applying the defined technique to select one of the codevectors of the first codebook; and (d') transmitting an indication of the identifying code of the selected orientation and the address of the selected corresponding codevector, and wherein step (e) further comprises obtaining the identifying code from the transmitted indication and employing the identifying code and the codevector obtained in step (iii)(2) or (iv) to re-orient, if necessary, the obtained codevector so as to substantially re-create the image data.

27. In a cable television system, a method of communicating image data to receiving locations of pay television signals, comprising the steps of:

(a) receiving image data to be transmitted, and converting the image data to an input vector;

(b) providing, in a memory located at a transmitter location of pay television signals, a first tree-search vector quantization codebook having a plurality N of levels of codevectors, the codevectors at each succeeding level of the first codebook representing possible input vectors with generally greater accuracy than the codevectors at a preceding level, there being a memory address associated with each of said codevectors, the address associated with each codevector having a length corresponding to the level at which that codevector resides such that the addresses of codevectors at a same level have a same length and the lengths of the addresses increase with each successive level;

(c) comparing the input vector to the codevectors at each level of the first codebook until the Nth level is reached, and selecting from the Nth level the codevector that most closely resembles the input vector;

(d) transmitting an indication of at least the address associated with the selected codevector to the receiving locations of the pay television signals; and (e) performing the following additional steps at each receiving location;

(i) providing, in a memory at each receiving location, a second tree search vector quantization codebook having a plurality L of levels of codevectors, where L is a user selectable number between 1 and N inclusive, the codevectors of the L levels of the second codebook corresponding to th codevectors of the first L levels of the first codebook on a one to one basis, each of the codevectors of the second codebook being substantially identical to the corresponding codevector of the first codebook;

(ii) receiving the transmitted indication at each receiving location, obtaining the address therefrom, the obtained address being capable of addressing up to an Nth level of codevectors;

(iii) performing the following steps (1) and (2) when the number L of levels in the second codebook is less than the number N of levels in the first codebook, but proceeding to step (iv) below when the number L of levels in the second codebook is equal to the number N of levels in the first codebook:

(1) truncating the obtained address for addressing only up to the Lth level of codevectors in the second codebook; and (2) retrieving from the Lth level of the second codebook the codevector residing at the truncated address to obtain a representation of the codevector selected in step (c), and proceeding to step (v);

(iv) employing the obtained address in a non-truncated form to retrieve from the Lth level of the second codebook the codevector residing at the obtained address to substantially reproduce the codevector selected in step (c);

(v) employing the codevector obtained in step (iii)(2) or (iv) to substantially re-create the image data at the second location, the re-created image data having an accuracy that is a function of the number L of levels in the second codebook, the re-created image data being most accurate when L is equal to N.

28. Method according to claim 27 wherein the receiving locations are locations of direct broadcast satellite pay television subscribers, and wherein the indication is transmitted directly to the receiving locations via satellite.

29. Method according to claim 27 wherein the receiving locations are locations of a cable head-end and wherein the indication is transmitted via satellite to each cable-head end and then television signals are transmitted from each cable-head end to cable television subscribers via a cable distribution network.

30. Method according to claim 29 wherein the television signals transmitted from the cable-head end to the cable television subscribers are a retransmitted form of the indications received at the cable head-end.

31. Method according to claim 27 wherein the indications received at the receiving locations are converted to NTSC format signals and then transmitted over a cable television distribution network to a plurality of cable television subscribers.

32. Method according to claim 1, 18, or 27 wherein the codevectors of ht first codebook are transformed to a transform domain before being provided in the first codebook, and the codevectors are stored in the first codebook in the transform domain, and wherein each input vector is transformed to the transform domain for selecting one of the codevectors from the first codebook.

33. Method according to claim 32 wherein the transform domain is the frequency domain and the codevectors and input vectors are transformed to the frequency domain by a Fourier transform.

34. A pay television system for transmitting data indicative of temporally spaced image frames representing moving pictures to a plurality of receivers of pay television signals, wherein each image frame comprises a plurality of blocks of image data, the pay television system comprising:

a transmitter of pay television signals comprising:

a means for receiving the blocks of image data to be transmitted, and for converting each block of image data to an input vector;

a vector quantization encoder employing a first tree search codebook having N levels of codevectors, each codevector representing a possible input vector and having an address associated therewith, the encoder comparing each input vector to the codevectors of the first codebook and selecting for each input vector the codevector that most closely resembles the input vector; and a means for transmitting indications of at least the addresses of the selected codevectors;

each of the plurality of pay television receivers comprising:

a means for receiving each of the indications transmitted from the transmitter of pay television signals and for each indication obtaining the address therefrom;

a vector quantization decoder employing a second tree search codebook having L levels of codevectors, where L is a subscriber selectable number between 1 and N inclusive, the codevectors of the L levels of the second codebook being substantially identical to the codevectors of a corresponding first L levels of the first codebook, the decoder placing the obtained addresses in a form for addressing up to the Lth level of codevectors in the second codebook and obtaining a representation of the codevectors selected at the transmitter by retrieving from the second codebook the codevectors residing at the obtained addresses, different ones of the receivers having a different number of levels L in their respective codebooks; and means for employing the retrieved codevectors to substantially re-create the blocks of image data for display on a television set at a locale of the receiver.

35. Apparatus according to claim 34 wherein the codevectors of the first codebook are transformed to a transform domain before being provided in the first codebook, and the codevectors are stored in the first codebook in the transform domain, and wherein the encoder is further operative to transform each input vector to the transform domain prior to comparing the input vector to the codevectors of the first codebook.

36. Apparatus according to claim 35 wherein the transform domain is the frequency domain and the codevectors and input vectors are transformed to the frequency domain by a Fourier transform technique.

* * * * *